(12) United States Patent
Hui et al.

(10) Patent No.: US 12,334,748 B2
(45) Date of Patent: Jun. 17, 2025

(54) WIRELESS BATTERY CHARGING SYSTEM AND METHOD FOR BATTERY CHARGING AND HANDSHAKING

(71) Applicant: THE UNIVERSITY OF HONG KONG, Hong Kong (CN)

(72) Inventors: Shu Yuen Ron Hui, Hong Kong (CN); Yun Yang, Hong Kong (CN)

(73) Assignee: The University of Hong Kong, Hong Kong (CN)

( * ) Notice: Subject to any disclaimer, the term of this patent is extended or adjusted under 35 U.S.C. 154(b) by 603 days.

(21) Appl. No.: 17/754,244

(22) PCT Filed: Sep. 21, 2020

(86) PCT No.: PCT/CN2020/116514
§ 371 (c)(1),
(2) Date: Mar. 28, 2022

(87) PCT Pub. No.: WO2021/057658
PCT Pub. Date: Apr. 1, 2021

(65) Prior Publication Data
US 2022/0368160 A1 Nov. 17, 2022

Related U.S. Application Data

(60) Provisional application No. 62/906,180, filed on Sep. 26, 2019.

(51) Int. Cl.
*H02J 7/00* (2006.01)
*H02J 50/12* (2016.01)
*H02J 50/80* (2016.01)

(52) U.S. Cl.
CPC ............ *H02J 50/12* (2016.02); *H02J 7/0048* (2020.01); *H02J 7/005* (2020.01); *H02J 7/007182* (2020.01); *H02J 50/80* (2016.02)

(58) Field of Classification Search
CPC .......... H02J 50/12; H02J 7/0048; H02J 7/005; H02J 7/007182; H02J 50/80; H02J 7/00034; H02J 7/00045
See application file for complete search history.

(56) References Cited

U.S. PATENT DOCUMENTS

| 2012/0223590 A1 | 9/2012 | Low et al. |
| 2016/0025821 A1* | 1/2016 | Widmer ............. G01R 33/0206 |
| | | 324/258 |

(Continued)

FOREIGN PATENT DOCUMENTS

| CN | 104348236 A | 2/2015 |
| CN | 104868603 A | 8/2015 |

(Continued)

OTHER PUBLICATIONS

International Search Report dated Dec. 21, 2020 in International Application No. PCT/CN2020/116514.

*Primary Examiner* — Nghia M Doan
(74) *Attorney, Agent, or Firm* — Saliwanchik, Lloyd & Eisenschenk

(57) ABSTRACT

Provided is coordinated control and use of a transmitter circuit and a receiver circuit for wireless battery charging, with emphasis on using power switches in the receiver circuit not only for handshaking with the transmitter circuit for compatibility check and communication of information but also for charging mode control of the battery. It utilizes extra switching operations of power switches in the receiver circuit (such as those commonly used in the Qi standard for handshaking with the transmitter circuit) to charge the battery directly from the output of the rectifier with the constant-current mode or constant-voltage mode according to a threshold battery voltage without using an extra battery management circuit between the rectifier of the receiver circuit and the battery. Coordinated operations of the trans- (Continued)

mitter and receiver circuits can be achieved without using any extra wireless communication system for signal synchronization between the two circuits.

13 Claims, 31 Drawing Sheets

(56) References Cited

U.S. PATENT DOCUMENTS

2018/0294674 A1* 10/2018 Choi ................. B60L 53/12
2019/0140470 A1*  5/2019 Wan ............... H02J 7/00714

FOREIGN PATENT DOCUMENTS

| CN | 106059110 A | 10/2016 |
| CN | 106560970 A |  4/2017 |
| CN | 108141055 A |  6/2018 |

* cited by examiner

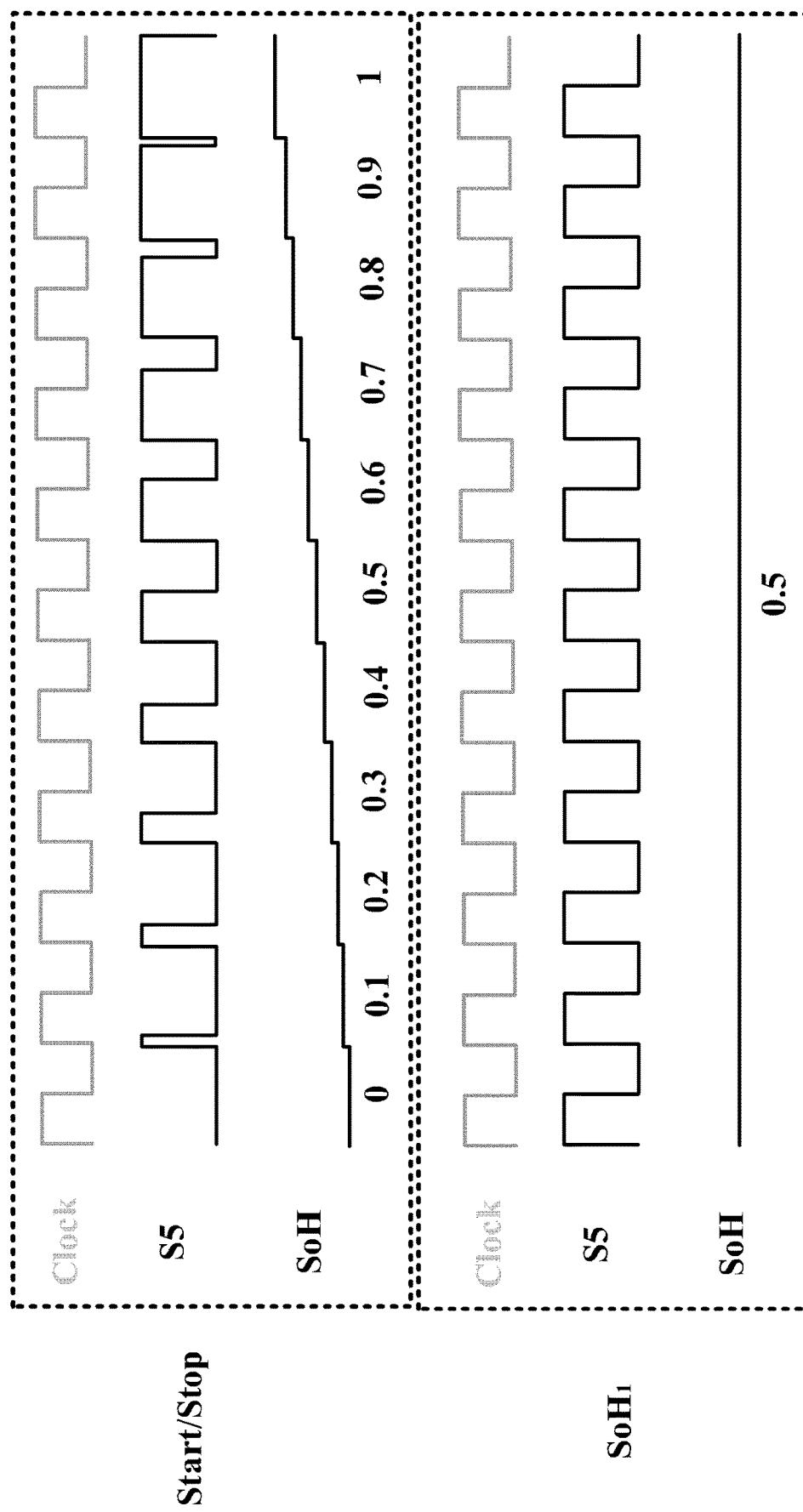

WIRELESS BATTERY CHARGING SYSTEM AND METHOD FOR BATTERY CHARGING AND HANDSHAKING

CROSS-REFERENCE TO RELATED APPLICATIONS

This application is the U.S. national stage application of International Patent Application No. PCT/CN2020/116514, filed Sep. 21, 2020, which claims the benefit of U.S. Provisional Application No. 62/906,180, filed Sep. 26, 2019, the disclosures of each of which are incorporated herein by reference in their entirety.

LIST OF ABBREVIATIONS

AC Alternating current
ASK Amplitude-shift keying
BMC Battery management circuit
CC Constant-current
CV Constant-voltage
DC Direct current
FSK Frequency-shift keying
LC Inductive-capacitive
LUT Look-up table
PI Proportional-integral
RMS Root-mean-square
Rx Receiver
SoC State-of-Charge
SoH State-of-Health
Tx Transmitter

TECHNICAL FIELD

The present invention generally relates to wireless battery charging. In particular, the present invention relates to a wireless battery charging system and a method for battery charging and handshaking between the Tx and the Rx.

BACKGROUND

A wireless charging system normally requires some form of wireless communication between the Tx and the load on the Rx side. For example, in the Qi standard launched by the Wireless Power Consortium, switched mode modulation techniques are used in the Rx circuit in order to send information packets from the Rx side to the Tx side. A packet is a data structure for communication between the Tx and Rx circuit. In FIG. 1, the switches S5 and S6 in the Rx circuit can be used to tie the capacitors Cd1 and Cd2 to ground in a switching manner. The switching actions of S5 and S6 will alter the impedance in the Rx circuit so that reflected impedance will affect the electric variables such as current in the Tx circuit. Similarly, FIG. 2 shows an alternative Rx circuit with a switch S5 that can switch a resistor Rd to ground in a switching manner. Typically, FSK or ASK can be used so that digital signals can be sensed and decoded by the Tx circuit (FIG. 3). The Qi standard specifies a list of coded packets for handshaking purposes based on FSK. These packets can be found in the Qi Standard documents and are not included here.

In general, a wireless charger compliant with the Qi standard provides a voltage source in the rectifier output of the Rx circuit. As shown in FIG. 1 and FIG. 2, An extra BMC is traditionally needed between this rectifier output and the battery load in order to control the CC mode and CV mode of a battery according to the battery charging profile (FIG. 4).

Traditional 2-coil series-series LC resonant circuit used for wireless charging systems can provide a "voltage-source" output that can meet the CV mode as indicated in FIG. 4. It was pointed out in a reference (C. S. Wang, O. H. Stielau, G. Covic, "Design considerations for a contactless electric vehicle battery charger", *IEEE Transactions on Industrial Electronics*, Vol. 52, No. 5, October 2004, pp: 1308-1314, the disclosure of which is incorporated by reference herein) that "[t]he series-compensated secondary resembles a voltage source, while the parallel-compensated secondary looks like a current source." For this reason, a battery charging circuit (also called battery management system) as shown in FIG. 5 is needed to turn the voltage source from the rectifier output of the Rx into either current-source for CC mode and voltage-source for CV mode. An example of the industrial battery charging circuit is the Texas Instrument bq5105 Integrated Circuit as shown in FIG. 6.

Despite many existing wireless charging systems, there is still a need in the art for a wireless battery charging technique improved in any practical aspect such as elimination of a DC regulator at a Rx side of the system. Elimination of the DC regulator potentially brings to an advantage in cost reduction in a practical situation in which receivers for receiving battery charging outnumber the transmitters for providing electrical power. Such practical situation may be, e.g., using a roadside battery-charging station for charging electric vehicles.

Furthermore, other desirable features and characteristics of the disclosed technique will become apparent from the subsequent detailed description and the appended claims, taken in conjunction with the accompanying drawings and this background of the disclosure.

SUMMARY OF THE INVENTION

A first aspect of this invention is to provide a wireless charging system for wirelessly charging a battery.

The system comprises a transmitter circuit, a receiver circuit, a transmitter controller and a receiver controller. The transmitter circuit comprises a power inverter used for driving a primary coil connected in series with a first resonant capacitor. The receiver circuit comprises a secondary coil connected in series with a second resonant capacitor and a diode rectifier. An output of the diode rectifier is arranged to drive the battery directly without using an extra battery charging circuit to select a CC charging mode or a CV charging mode to charge the battery. The receiver circuit further comprises a bidirectional switch having a dual function of charging the battery and handshaking with the transmitter circuit. The transmitter controller is configured to control the power inverter to switch at a constant and high frequency during normal wireless power transfer, and is further configured to receive information generated from switching actions of the bidirectional switch of the receiver circuit during handshaking. The receiver controller is configured to: control the receiver circuit to switch at a constant and high frequency during normal wireless power transfer, and to switch at a low frequency to generate the information during a handshaking process; compare a battery voltage ($V_{BAT}$) with a battery voltage threshold ($V_{OREG}$) and a battery charging current ($I_{BAT}$) with a charging current reference ($I_{BULK}$) so as to automatically select the CC charging mode or the CV charging mode; and configure the receiver circuit to switch at the same constant and high frequency with the transmitter circuit during a battery charging process.

In certain embodiments, the transmitter controller and the receiver controller are co-configured to perform at least the battery charging process and the handshaking process such that wireless power is transferred from the primary resonator to the secondary resonator during the battery charging process and such that communication and compatibility checking between the transmitter circuit and the receiver circuit occur during the handshaking process.

In certain embodiments, the bidirectional switch is configured to perform handshaking with the transmitter circuit so as to inform the transmitter circuit whether the CC charging mode or the CV charging mode is selected to charge the battery.

In certain embodiments, both the transmitter circuit and the receiver circuit are switched at the same high frequency during the battery charging process, while the transmitter circuit is switched at the same high frequency and the receiver circuit is switched at a relatively low frequency during the handshaking process.

In certain embodiments, the power inverter is a full-bridge inverter, a half-bridge inverter or a multilevel inverter.

In certain embodiments, the high frequency is set at a resonant frequency of a secondary resonator formed by the secondary coil and the second resonant capacitor, or at a frequency slightly higher than the resonant frequency of the secondary resonator so as to achieve soft switching in the power inverter.

In certain embodiments, the receiver circuit further comprises a first mechanism configured to determine a State-of-Health of the battery after the battery is fully charged, and a second mechanism configured to transfer information related to a State-of-Charge to the transmitter circuit.

In certain embodiments, the transmitter circuit and the receiver circuit are arranged to have switching signals of the transmitter circuit and receiver circuit automatically synchronized at the same high frequency during the battery charging process without using a wireless communication system for feedback and synchronization purposes.

A second aspect of this invention is to provide a method for wirelessly charging a battery.

The method comprises: providing the wireless charging system according to any of the embodiments as disclosed above in the first aspect of this invention; automatically selecting the CC mode and regulating the battery charging current to a value of $I_{BAT(SC)}$ or $I_{PRECHG}$ or $I_{BULK}$ according a battery voltage in a battery charging profile of FIG. 15 when the battery voltage $V_{BAT}$ is less than a battery voltage threshold ($V_{OREG}$); and automatically selecting the CV mode and regulating the battery voltage to $V_{OREG}$ when $V_{BAT}$ is larger than or equal to $V_{OREG}$.

In certain embodiments, the method further comprises: configuring both of the transmitter circuit and the receiver circuit to switch at the same high frequency during the battery charging process; and configuring the transmitter circuit to switch at the same high frequency and the receiver circuit to switch at a relatively low frequency during the handshaking process.

In certain embodiments, the method further comprises: controlling the receiver circuit to switch at the constant and high frequency during normal wireless power transfer, and to switch at the low frequency to generate the information during the handshaking process; comparing the battery voltage ($V_{BAT}$) with the battery voltage threshold ($V_{OREG}$) and the battery charging current ($I_{BAT}$) with the charging current reference ($I_{BULK}$) so as to automatically select the CC charging mode or the CV charging mode; and configuring the receiver circuit to switch at the same constant and high frequency with the transmitter circuit during the battery charging process.

In certain embodiments, the method further comprises: determining a State-of-Health of the battery after the battery is fully charged; and transferring information related to a State-of-Charge to the transmitter circuit.

In certain embodiments, the method further comprises automatically synchronizing switching signals of the transmitter circuit and receiver circuit at the same high frequency during the battery charging process without using a wireless communication system for feedback and synchronization purposes.

Other aspects of the present invention are disclosed as illustrated by the embodiments hereinafter.

BRIEF DESCRIPTION OF THE DRAWINGS

The accompanying figures, where like reference numerals refer to identical or functionally similar elements throughout the separate views and which together with the detailed description below are incorporated in and form part of the specification, serve to illustrate various embodiments and to explain various principles and advantages in accordance with a present embodiment.

Skilled artisans will appreciate that elements in the figures are illustrated for simplicity and clarity and have not necessarily been depicted to scale.

DETAILED DESCRIPTION OF THE INVENTION

The following detailed description is merely exemplary in nature and is not intended to limit the invention or the application and uses of the invention. Furthermore, there is no intention to be bound by any theory presented in the preceding background of the invention or the following detailed description.

Figure 1:
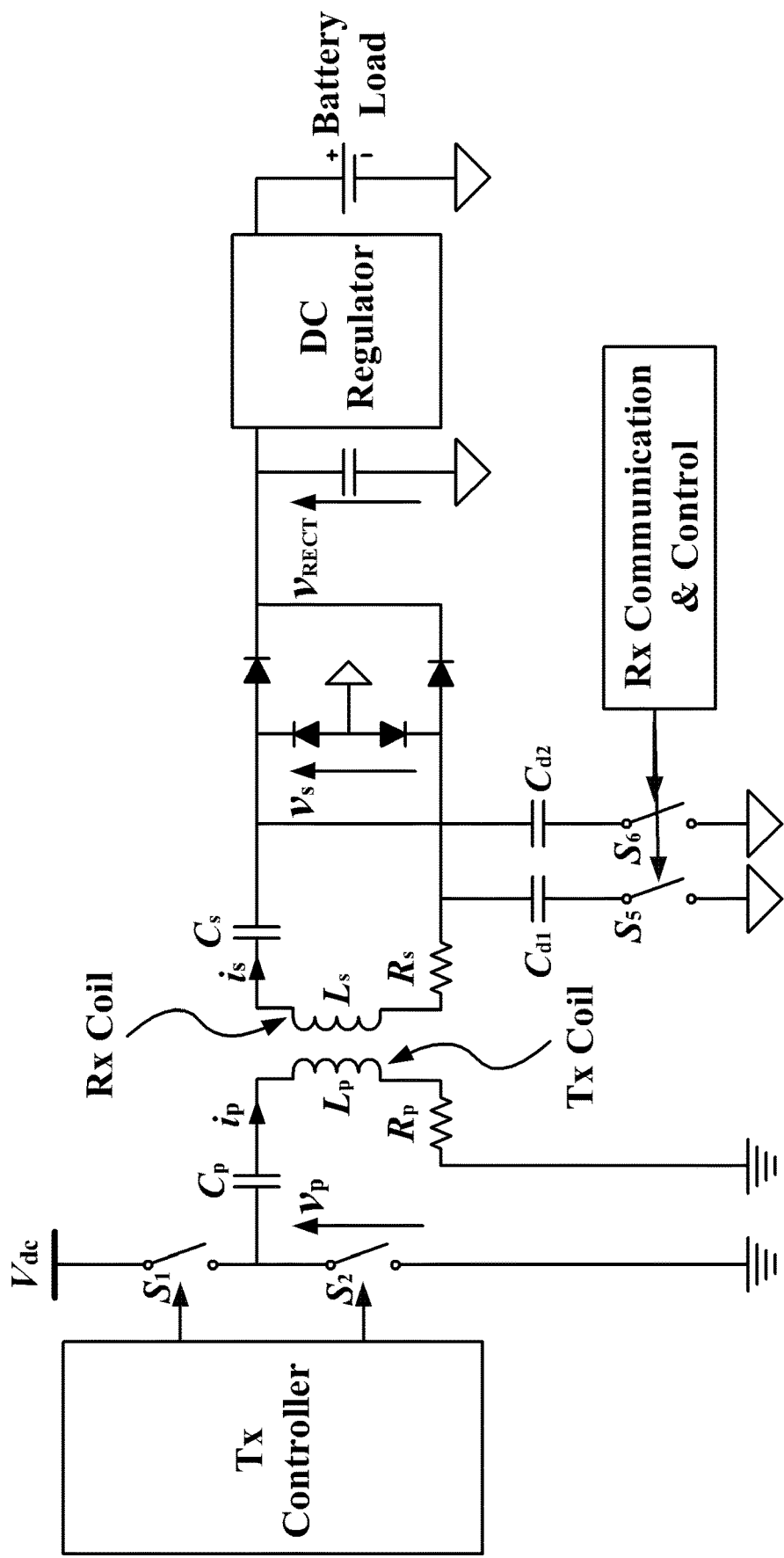
FIG. 1 depicts an example of a wireless charging system with secondary switches S5 and S6 used for communication based on the Qi standard (using capacitors to alter the Rx circuit impedance).
Figure 2:
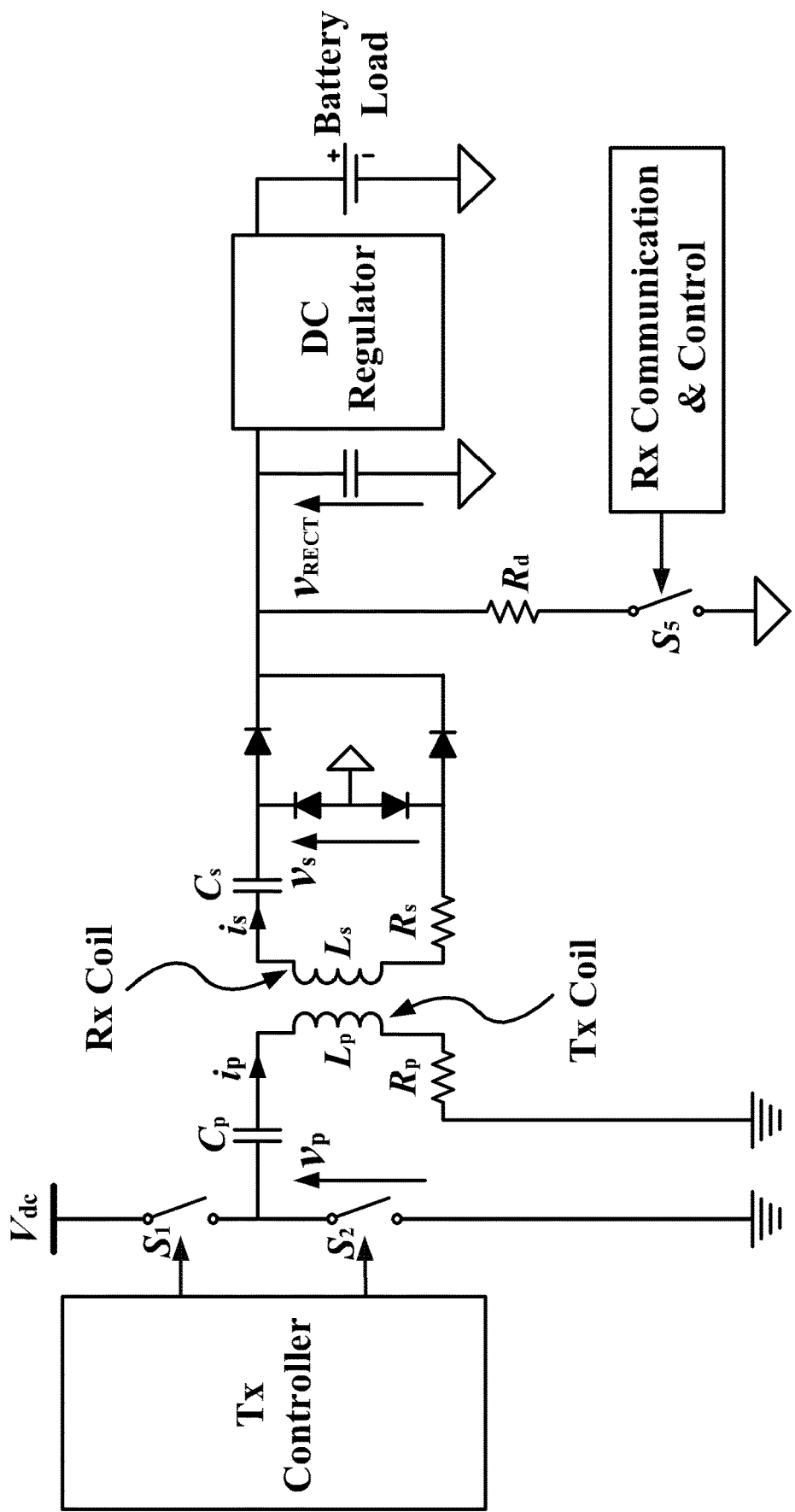
FIG. 2 depicts an example of a wireless charging system with secondary switch S5 used for communication based on the Qi standard (using resistors to alter the Rx circuit impedance).
Figure 3:
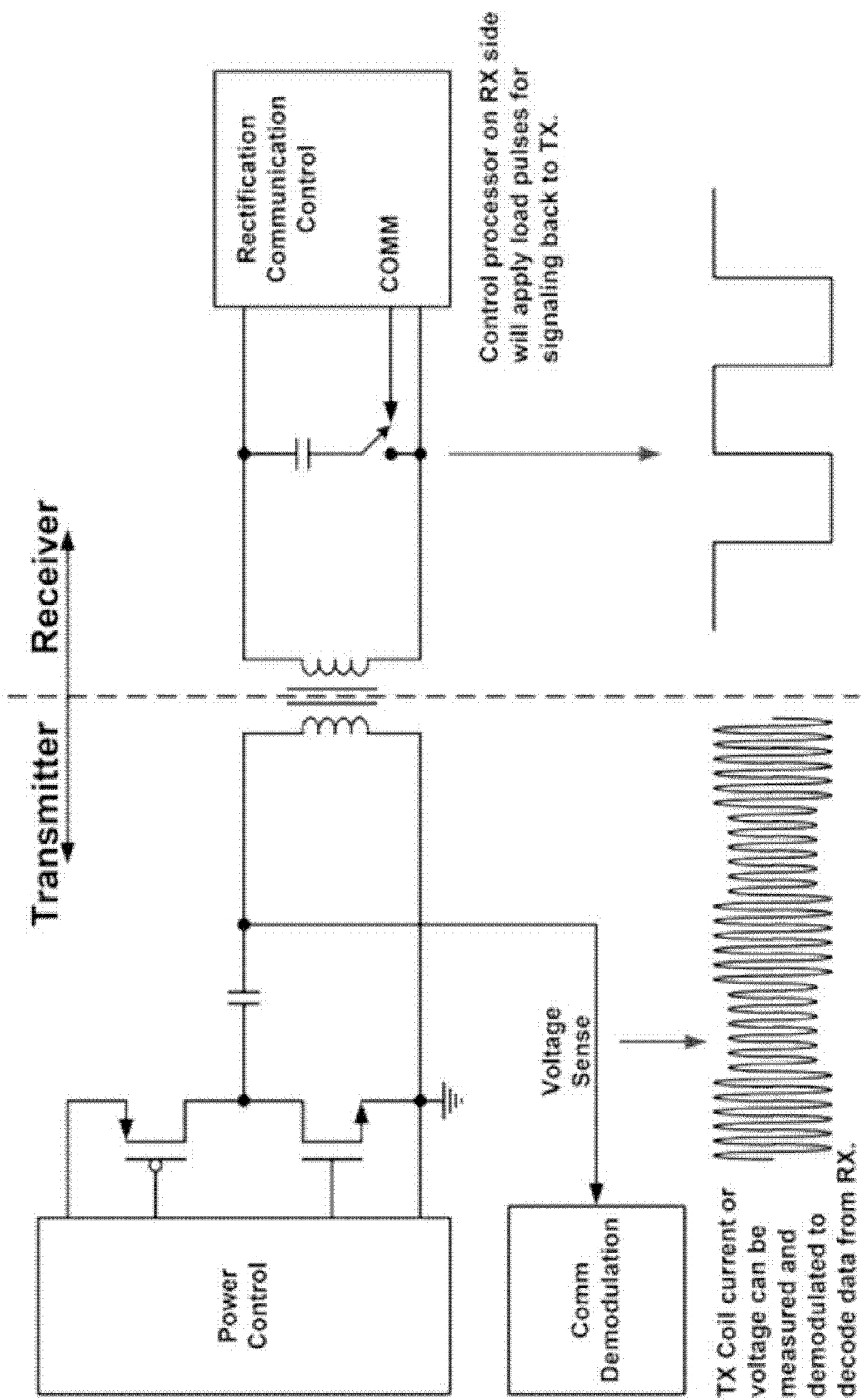
FIG. 3 depicts a use of switch in the Rx circuit for communication with the Tx circuit.
Figure 4:
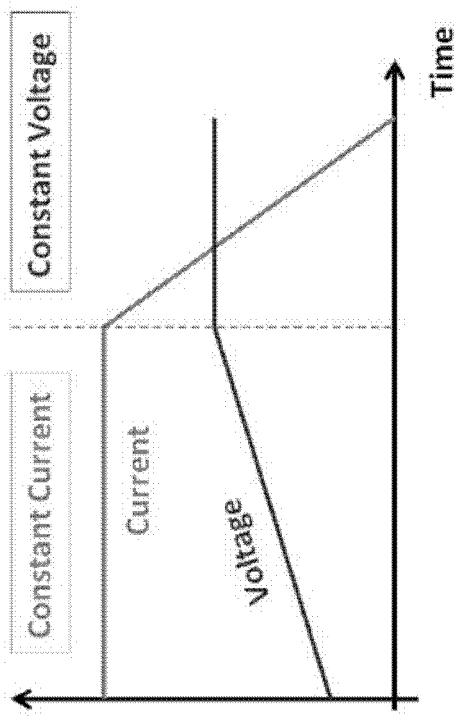
FIG. 4 depicts current and voltage characteristics of typical initial CC and subsequent CV charging modes of batteries.
Figure 5:
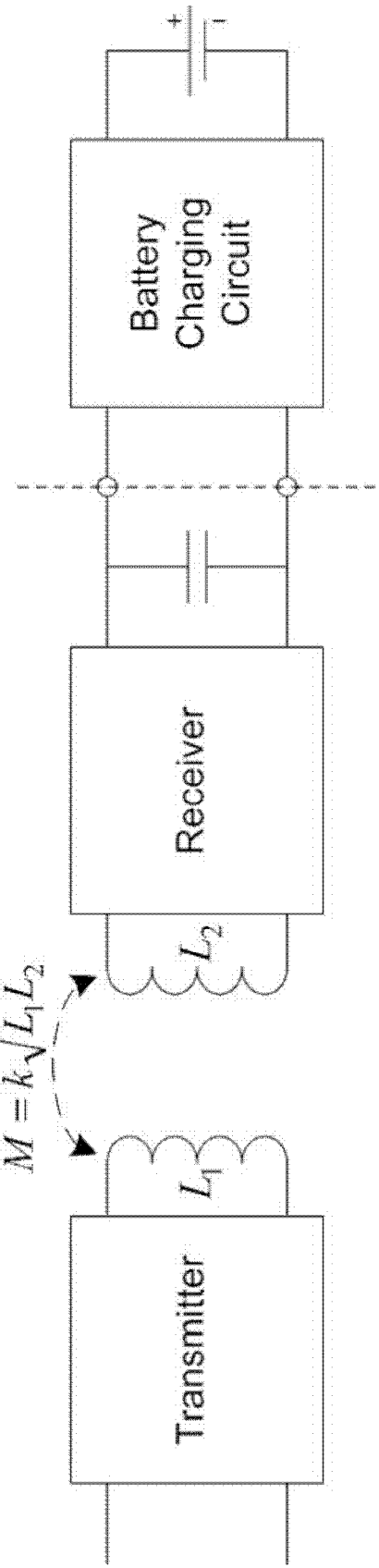
FIG. 5 depicts a schematic of wireless charging system using a battery charging circuit for CC and CV mode control between the Rx circuit and the battery load.
Figure 6:
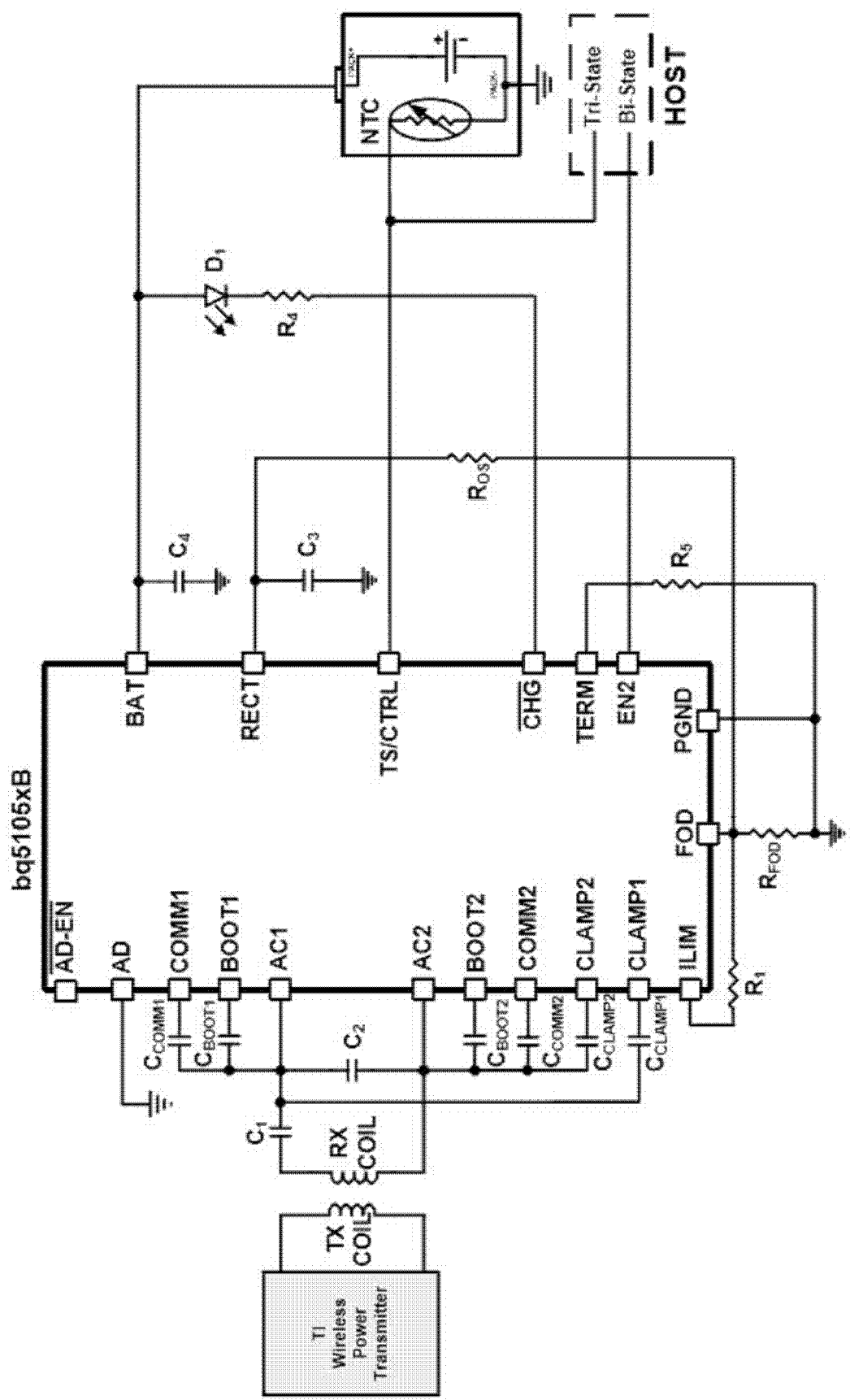
FIG. 6 depicts the schematic of a Texas Instruments Battery Charging Integrated Control Circuit using a "fixed" battery voltage threshold for selecting CC and CV charging mode.

This invention utilizes the switch or switches in the Rx circuit, not only for the originally intended communication purposes as required in the Qi standard for example (FIG. 1 and FIG. 2) but also for playing a role in the charging mode of the battery. As explained by Wang, O. H. Stielau and G. Covic, a series-compensated secondary (Rx) circuit only provides a "voltage" source, which is suitable for the CV mode only but not CC mode in FIG. 3. In this invention, the series-series compensated wireless charging system will use the switches previously intended for communication purposes (such as S5 and S6 in FIG. 1 and FIG. 2) to provide a "current" source in the output of the Rx circuit during the CC mode in FIG. 3 without using the extra battery charging circuit as shown in FIG. 4 and FIG. 5.

This invention involves the combination of the following aspects.

1) The combined use of both Tx controller and Rx controller is advantageously utilized. This combined use includes the newly disclosed switching actions in the Rx circuit of a wireless charging system for providing CC and CV charging modes, with both the Tx circuit and Rx circuit switching at the SAME resonant frequency of the Rx resonant frequency.
2) The rectifier output of the Rx circuit is used to charge the battery directly without the use of the extra battery charging circuit.
3) The coordinated use of the Tx and Rx controllers and the switching actions of the Tx circuit and Rx circuit for 1) and 2) can be achieved without any extra wireless communication for signal synchronization between the Tx and Rx circuits. That is, signal synchronization between the Tx and Rx circuits is automatic.
4) The selection of the CC mode and CV mode in (i) can be determined by either comparing a battery threshold voltage with the actual battery voltage, or comparing the SoH threshold of the battery with the estimated SoH of the battery.

Figure 7:
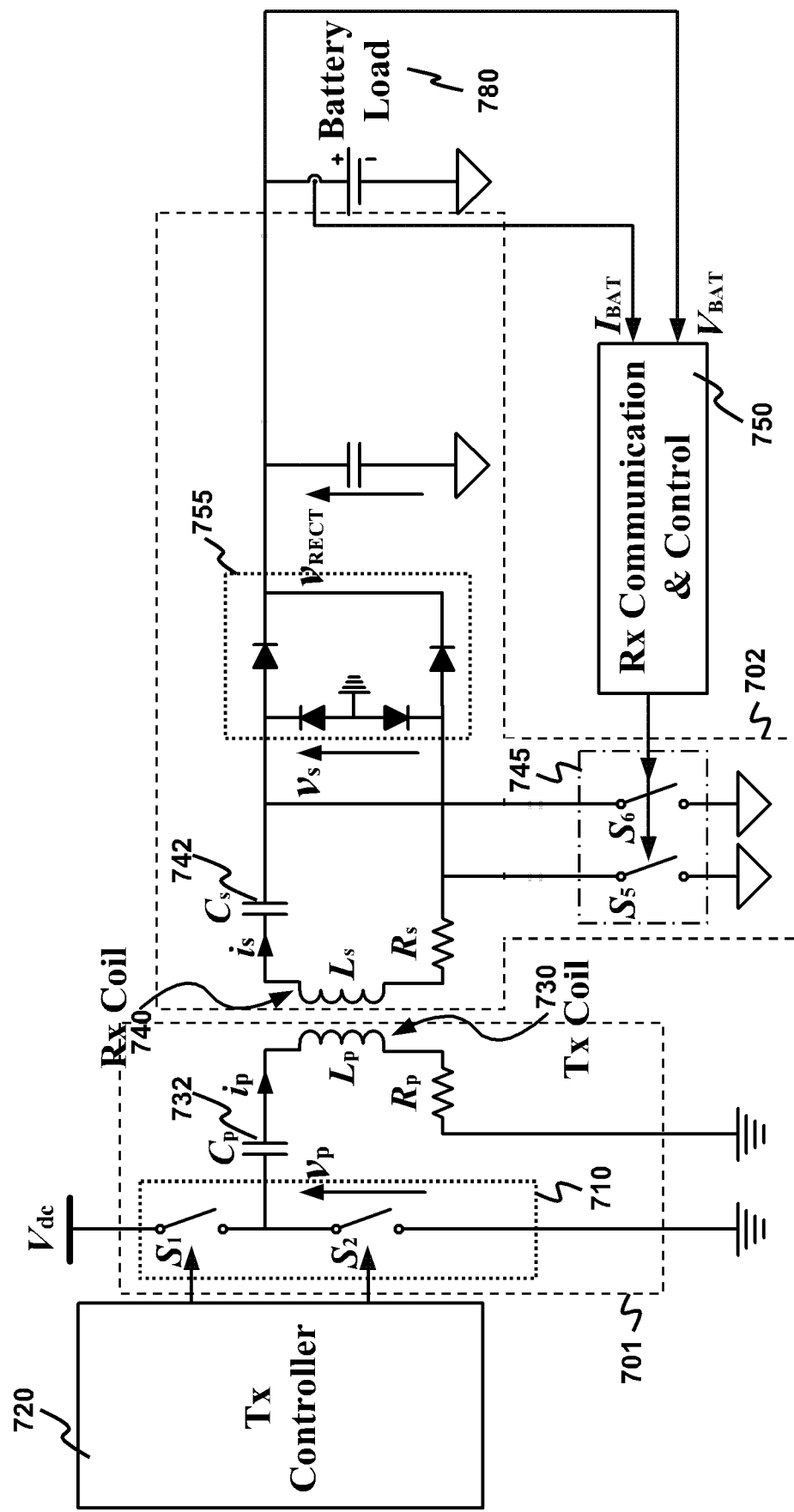
FIG. 7 depicts a first implementation embodiment of the disclosed wireless battery charging system (eliminating the extra power stage of voltage regulator between the output rectifier of the Rx circuit and battery) in accordance with certain embodiments of the present invention.
Figure 8:
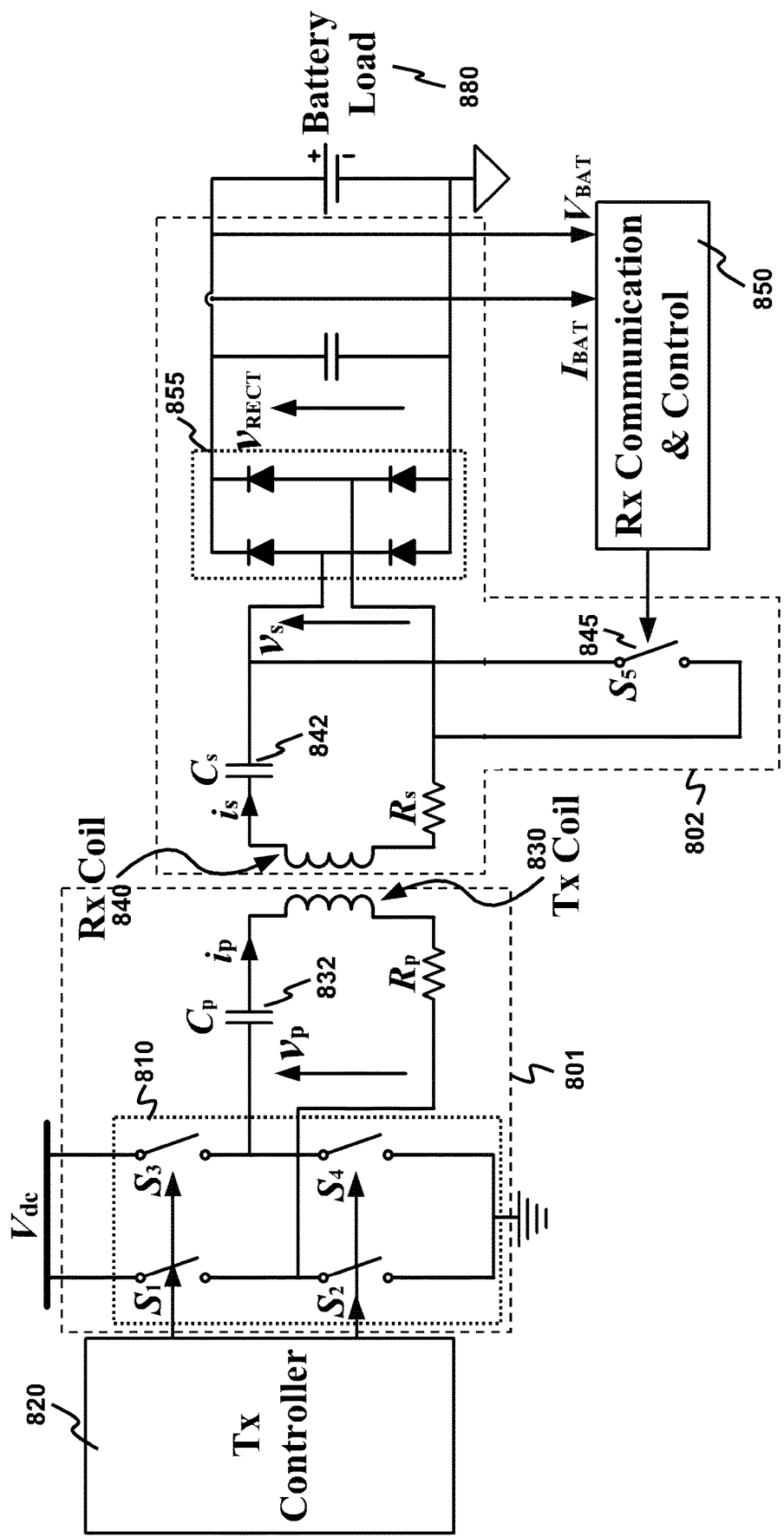
FIG. 8 depicts a second implementation embodiment of the disclosed system in accordance with certain embodiments of the present invention.

Two implementation embodiments of the disclosed wireless charging system involving a power inverter and a series primary resonant tank as the Tx circuit and a secondary resonant tank and a rectifier as the Rx circuit feeding directly the battery (without the extra DC regulator or battery charging circuit) are shown in FIG. 7 and FIG. 8. In both embodiments, a Tx controller and a Rx controller are used to control the switching of the Tx circuit and Rx circuit, respectively.

Advantages of this invention over the existing technology are summarized as follows.

1) There is no need to use the extra DC regulator or battery charging circuit between the output rectifier of the Rx circuit and the battery, so that the disclosed wireless battery charging system has a higher energy efficiency and a reduced cost.
2) There is no need to use modulated capacitors or resistors (as required in existing Qi standard), thus simplifying the Rx circuit.
3) The communication function is retained, via the modulation of the switches in the Rx circuit (such as S5 and S6).
4) Additional functions are provided, including (i) battery current and voltage control, and (ii) front-end monitoring of SoH of the battery load.

All the functions, including coupling coefficient monitoring, output current/voltage control, and front-end monitoring of SoH can be implemented without communication between the Tx and the Rx. The coordinated use of Tx and Rx circuits and controllers without an extra wireless communication system in accordance with certain embodiments of the present invention is detailed as follows.

The Tx circuit comprises a power inverter driving a primary coil resonator that comprises a primary coil ($L_p$) and a series-connected capacitor ($C_p$). The stray resistance in $L_p$ and $C_p$ is represented as $R_p$ in FIG. 7 and FIG. 8. The power inverter generates an AC rectangular voltage across the primary resonator comprising the Tx (primary) coil ($L_p$) and a series-connected capacitor ($C_p$). The Rx circuit comprises a Rx (secondary) coil ($L_s$) and series-connected capacitor ($C_s$), with $L_s$ and $C_s$, forming the secondary resonator. The stray resistance of this Rx resonator is represented as $R_s$. The Rx resonator feeds a rectifier with a smoothing capacitor across its output, and such rectifier is connected directly to the battery load without using any battery management circuit between the rectifier and the battery. In this invention, the switches such as S5 and S6 in FIG. 7 and FIG. 8 are included for dual purposes. They are used for communication with the Tx circuit and also for providing a controlled current source output in the rectifier.

Section A: Using Rx Controller to Regulate $I_{BAT}$ and $V_{BAT}$

Figure 9:
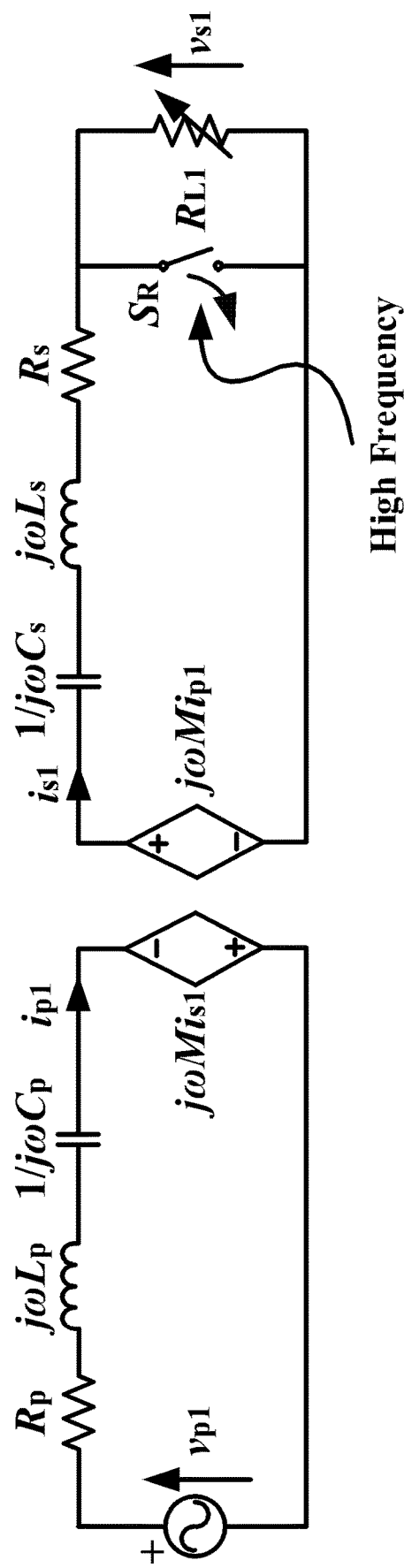
FIG. 9 depicts a simplified equivalent circuit of a series-series magnetic resonant wireless charging circuit.
Figure 10:
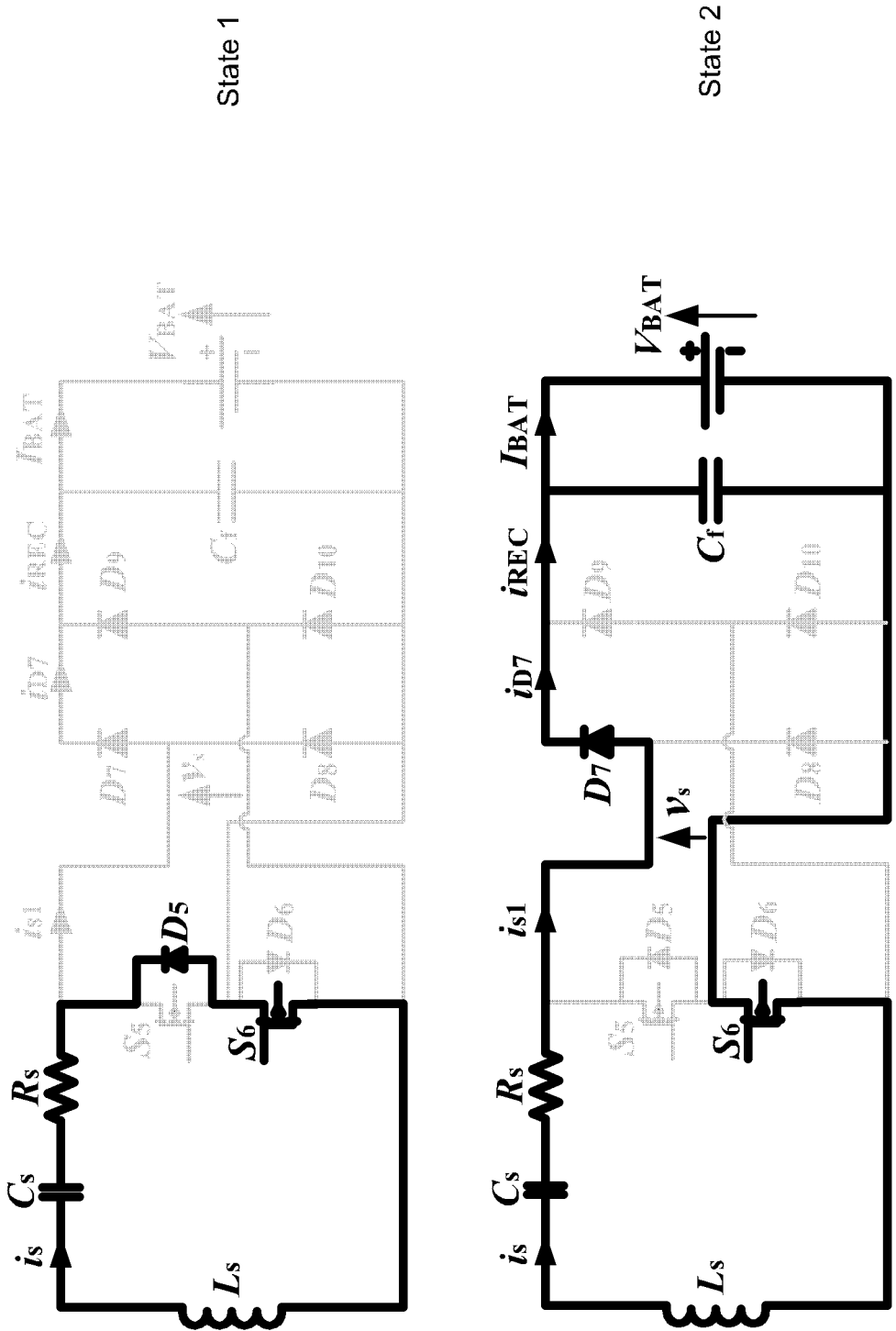
FIG. 10 depicts various switching states of the disclosed Rx circuit switch for charging the battery directly through the diode rectifier.
Figure 10:
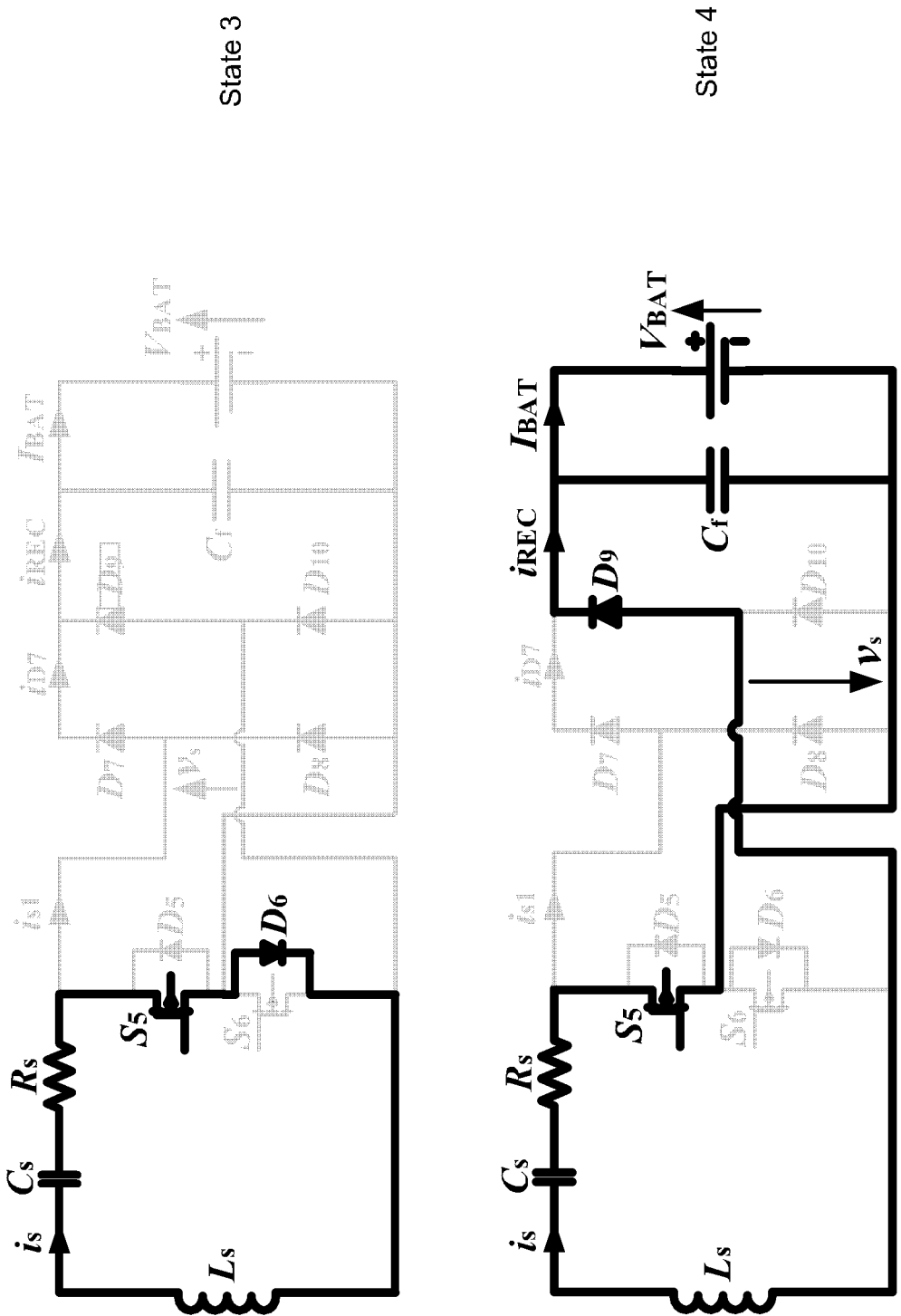

The goal of regulating $I_{BAT}$ and $V_{BAT}$ is achieved by having $S_R$ ON and OFF with high frequency ($\omega_R = \omega_o$). FIG. 9 shows the simplified equivalent circuit of the series-series magnetic resonant wireless charging system. $S_R$ refers to a switch used in the Rx circuit in this invention for controlling the charging mode of the battery. This Rx circuit switch $S_R$ could be a bidirectional switch comprising two switches $S_5$ and $S_6$ as shown in FIG. 10. The equivalent load $R_{L1}$ could comprise a diode rectifier feeding a battery load as shown in FIG. 10.

Section A.1: Switching Sequences and Corresponding Waveforms

Figure 11:
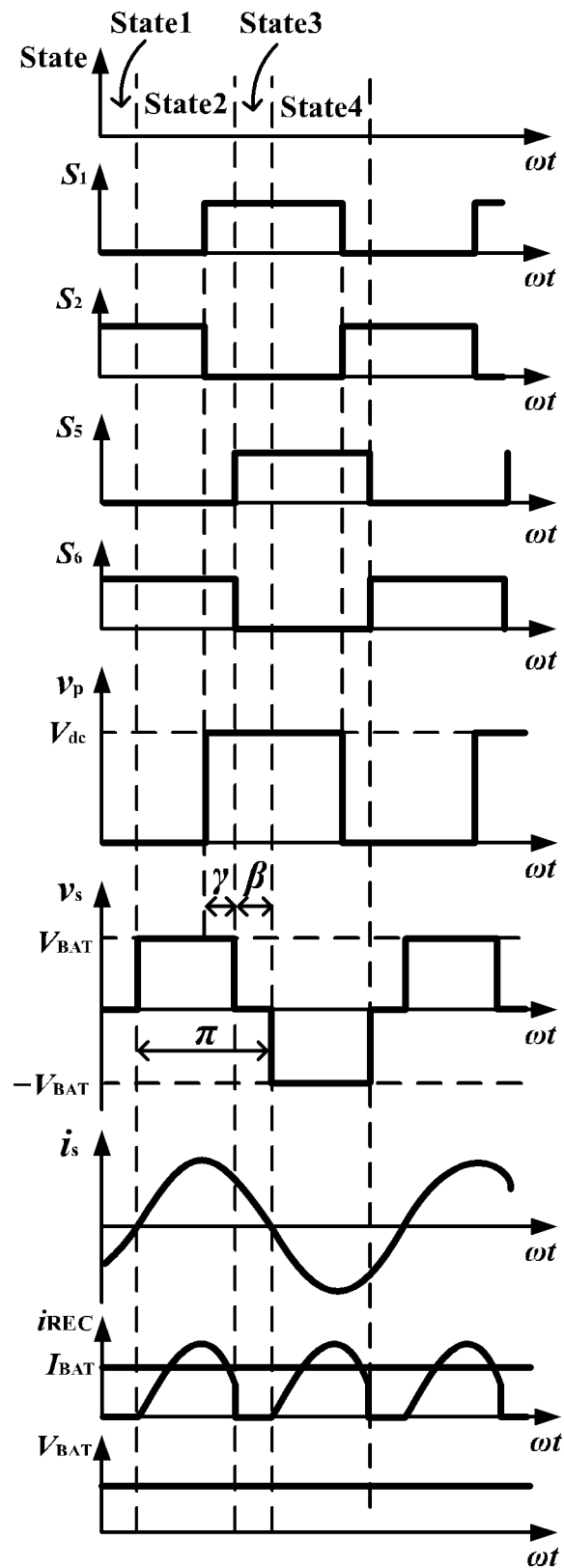
FIG. 11 depicts various waveforms of the disclosed wireless charging circuit.
Figure 12:
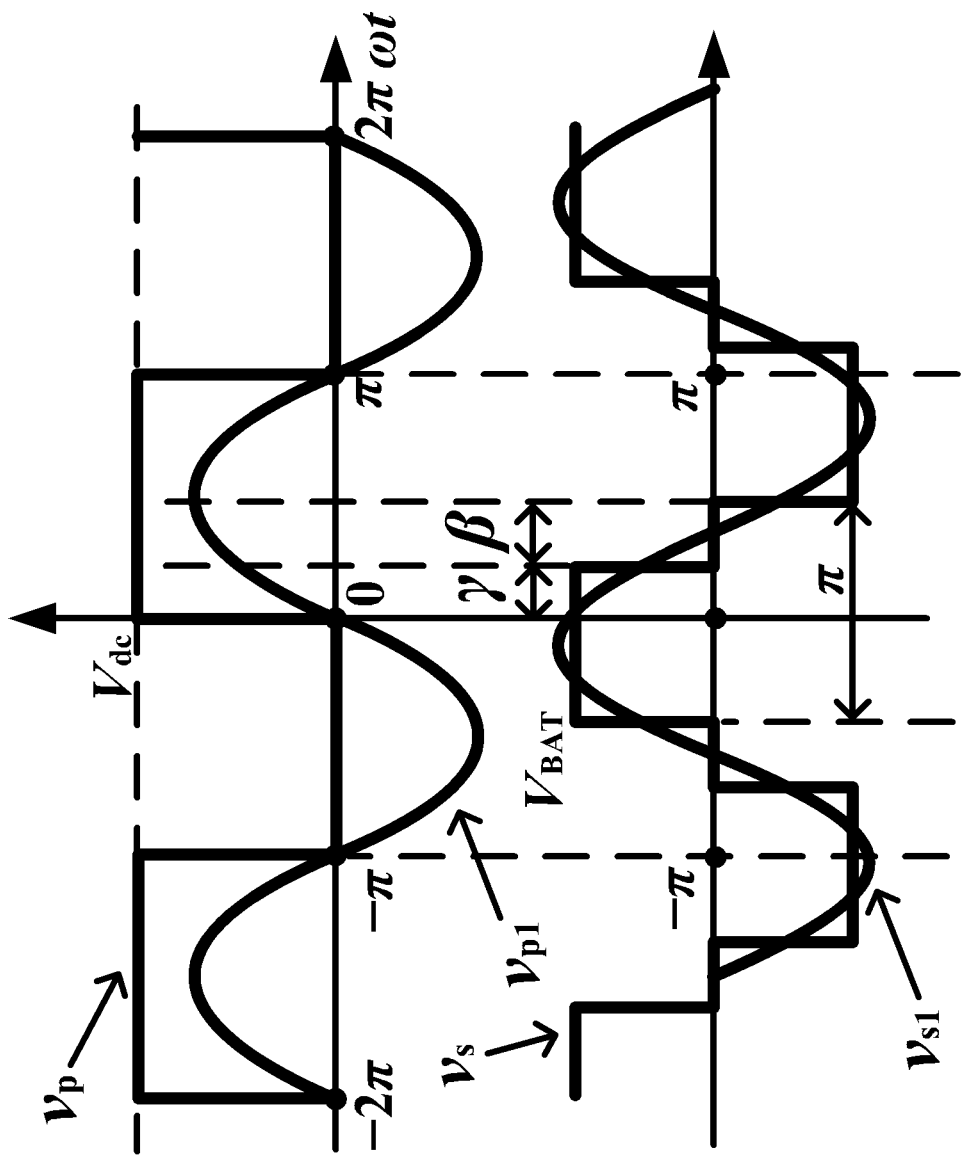
FIG. 12 depicts typical waveforms of the disclosed Tx and Rx circuits.

The switching sequences of the Tx switch $S_T$ (S1 and S2) and the Rx switch $S_R$ (S5 and S6) and the corresponding waveforms of $v_p$, $v_s$, $i_s$, $i_{REC}$, $I_{BAT}$, and $V_{BAT}$ are depicted in FIG. 11, where: $\beta$ is the phase shift of $v_s$; and $\gamma$ is the phase shift angle between the switching signals $S_1$ and $S_5$.

The Rx circuit can operate in four states (States 1~4) as shown in FIG. 10.

1. During State 1 ($0 < \omega t \leq \beta$), switch $S_6$ is closed and switch $S_5$ is open. The current $i_s$ flows in the negative direction through switch $S_6$ and the body diode $D_5$, where $i_s < 0$, $v_s = 0$, and $i_{REC} = 0$.
2. During State 2 ($\beta < \omega t \leq \pi$), switch $S_6$ is closed and switch $S_5$ is open. The current $i_s$ flows in the positive direction through switch $S_6$ and diode $D_7$, where $i_s > 0$, $v_s = V_{BAT}$, and $i_{REC} = i_s$.
3. During State 3 ($\pi < \omega t \leq \pi + \beta$), switch $S_6$ is open and switch $S_5$ is closed. The current $i_s$ flows in the positive direction through switch $S_5$ and body diode $D_6$, where $i_s > 0$, $v_s = 0$, and $i_{REC} = 0$.
4. During State 4 ($\pi + \beta < \omega t \leq 2\pi$), switch $S_6$ is open and switch $S_5$ is closed. The current $i_s$ flows in the negative direction through switch $S_5$ and diode $D_9$, where $i_s < 0$, $v_s = -V_{BAT}$, and $i_{REC} = -i_s$.

Based on the equivalent circuit, at the resonant frequency, $$v_{p1} = \left(R_p + j\omega_o L_p + \frac{1}{j\omega_o C_p}\right)i_{p1} - j\omega_o M i_{s1} \quad (1)$$

and $$j\omega_o M i_{p1} = \left(R_s + j\omega_o L_s + \frac{1}{j\omega_o C_s}\right)i_{s1} + v_{s1} \quad (2)$$

where: $\omega_o$ is the switching angular frequency; $v_{p1}$, $v_{s1}$, $i_{p1}$, and $i_{s1}$ are the fundamental components of $v_p$, $v_s$, $i_p$, and $i_s$.

Based on the Fourier-series expansion, $$v_{p1} = \frac{2V_{dc}}{\pi}\sin(\omega_o t), \quad (3)$$

$$v_{s1} = \frac{4V_{BAT}\cos\left(\frac{\beta}{2}\right)}{\pi}\sin\left(\omega_o t + \pi - \gamma - \frac{\beta}{2}\right) \quad (4)$$

and $$i_{s1} = I_{s1}\sin(\omega_o t + \varphi) \quad (5)$$

where $\varphi$ is the phase difference between $v_{p1}$ and $i_{s1}$. Simplifying (1) and (2) by cancelling the term $i_{p1}$ gives $$j\omega_o M v_{p1} = \left[\left(R_p + j\omega_o L_p + \frac{1}{j\omega_o C_p}\right)\left(R_s + j\omega_o L_s + \frac{1}{j\omega_o C_s}\right) + \omega_o^2 M^2\right]i_{s1} + \left(R_p + j\omega_o L_p + \frac{1}{j\omega_o C_p}\right)v_{s1} \quad (6)$$

Generally, the compensated capacitances $C_p$ and $C_s$ are designed around the resonant frequency, thereby giving $$C_p \approx \frac{1}{\omega_o^2 L_p} \quad (7)$$

and $$C_s \approx \frac{1}{\omega_o^2 L_s}. \quad (8)$$

Then, $$\left[\left(R_p + j\omega_o L_p + \frac{1}{j\omega_o C_p}\right)\left(R_s + j\omega_o L_s + \frac{1}{j\omega_o C_s}\right) + \omega_o^2 M^2\right]i_{s1} \gg \left(R_p + j\omega_o L_p + \frac{1}{j\omega_o C_p}\right)v_{s1} \quad (9)$$

and $$\omega_o^2 M^2 \gg \left(R_p + j\omega_o L_p + \frac{1}{j\omega_o C_p}\right)\left(R_s + j\omega_o L_s + \frac{1}{j\omega_o C_s}\right) \quad (10)$$

are satisfied for EQN. (6). By substituting EQNS. (9) and (10) into EQN. (6), it yields $$jv_{p1} \approx \omega_o M i_{s1}. \quad (11)$$

By substituting EQNS. (3) and (5) into EQN. (11) and transforming the phasor-domain expression into the time-domain expression, it gives $$\frac{2V_{dc}}{\pi}\sin\left(\omega_o t + \frac{\pi}{2}\right) \approx \omega_o M I_{s1}\sin(\omega_o t + \varphi). \quad (12)$$

To ensure that EQN. (12) is established, it is required that $$I_{s1} = \frac{2V_{dc}}{\pi\omega_o M} \quad (13)$$

and $$\varphi = \frac{\pi}{2}. \quad (14)$$

Figure 13A:
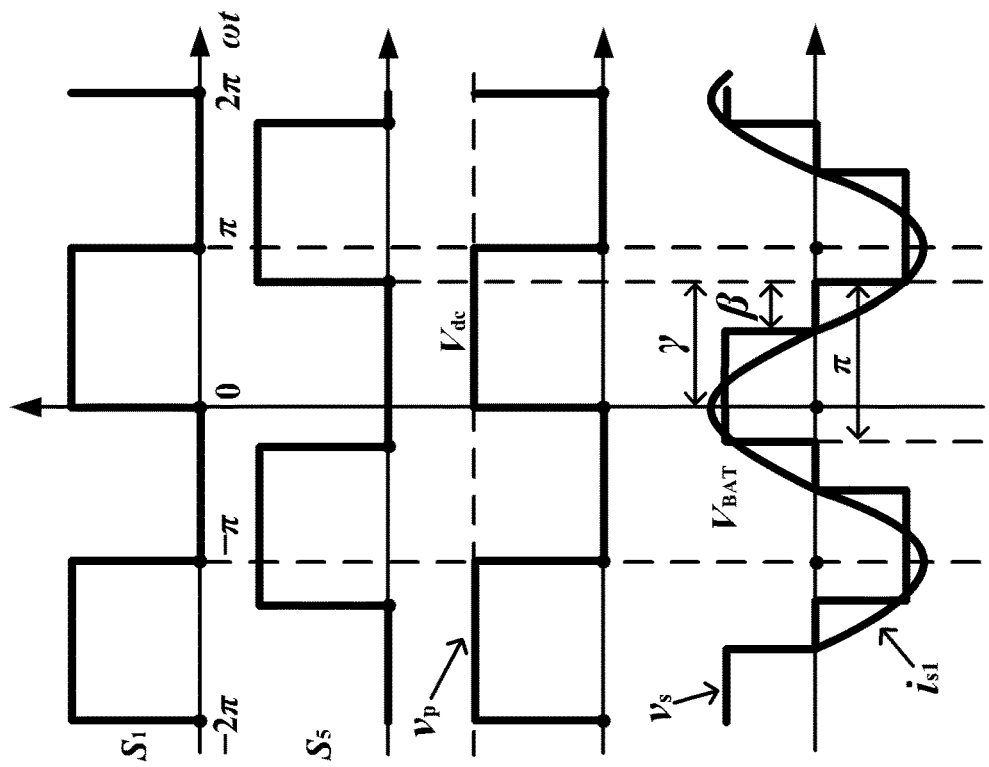
FIG. 13A depicts typical waveforms of the disclosed Tx and Rx circuits for $0 \leq \gamma < \pi/2$.

Besides, based on the operating principle of the Rx, the following situations occur. For $0 \leq \gamma < \pi/2$, referring to FIG. 13A, one gets $$\beta = \frac{\pi}{2} - \gamma. \quad (15)$$

Figure 13B:
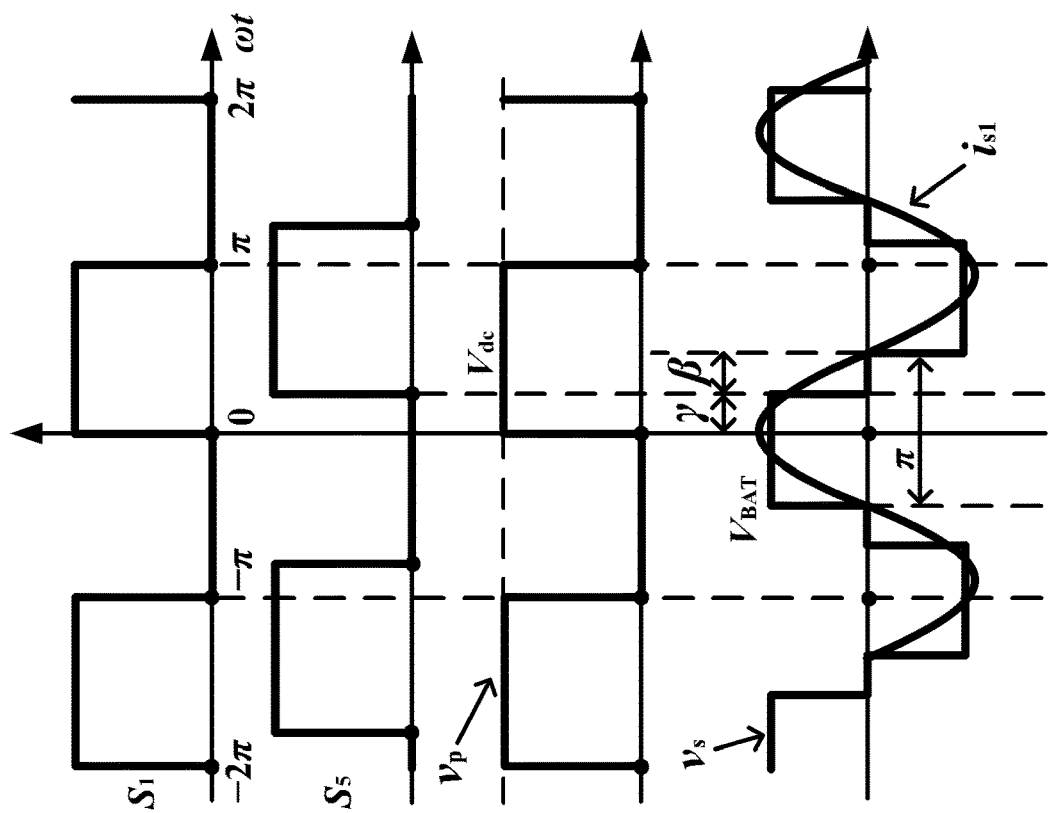
FIG. 13B depicts typical waveforms of the disclosed Tx and Rx circuits for $\pi/2 \leq \gamma < 3\pi/2$.

For $\pi/2 \leq \gamma < 3\pi/2$, referring to FIG. 13B, one gets $$\beta = \gamma - \frac{\pi}{2}. \quad (16)$$

Figure 13C:
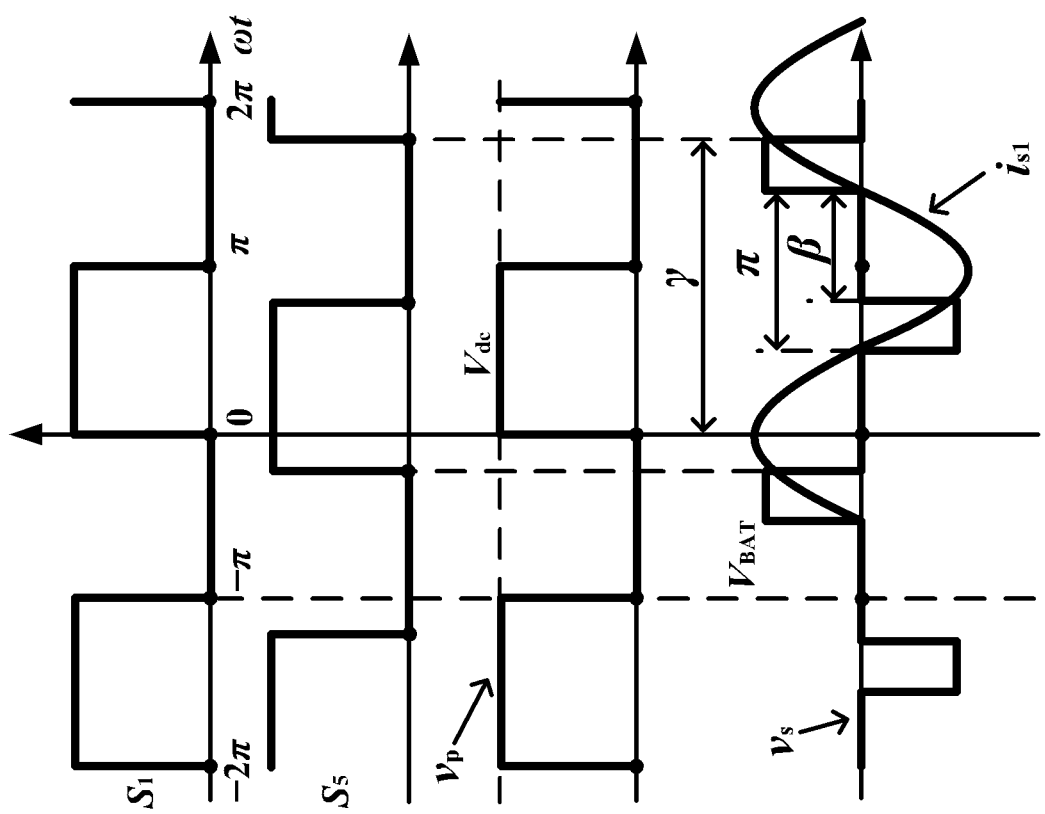
FIG. 13C depicts typical waveforms of the disclosed Tx and Rx circuits for $3\pi/2 \leq \gamma < 2\pi$.

For $3\pi/2 \leq \gamma < 2\pi$, referring to FIG. 13C, one gets $$\beta = \frac{5\pi}{2} - \gamma. \quad (17)$$

The charging current and charging voltage are given by $$I_{BAT} = \frac{I_{s1}(1 + \sin\gamma)}{\pi} \quad (18)$$

and $$V_{BAT} = \frac{I_{s1}(1 + \sin\gamma)Z_{BAT}}{\pi}, \quad (19)$$

respectively, where $Z_{BAT}$ is the equivalent impedance of the battery load. By substituting EQN. (13) into EQNS. (18) and (19), it yields $$I_{BAT} = \frac{2V_{dc}(1 + \sin\gamma)}{\pi^2 \omega_0 M} \quad (20)$$

and $$V_{BAT} = \frac{2V_{dc}(1 + \sin\gamma)Z_{BAT}}{\pi^2 \omega_o M}. \quad (21)$$

Obviously, the charging current and voltage can be controlled by the phase difference (i.e. $\gamma$) between the switching signals $S_1$ and $S_5$.

Figure 14:
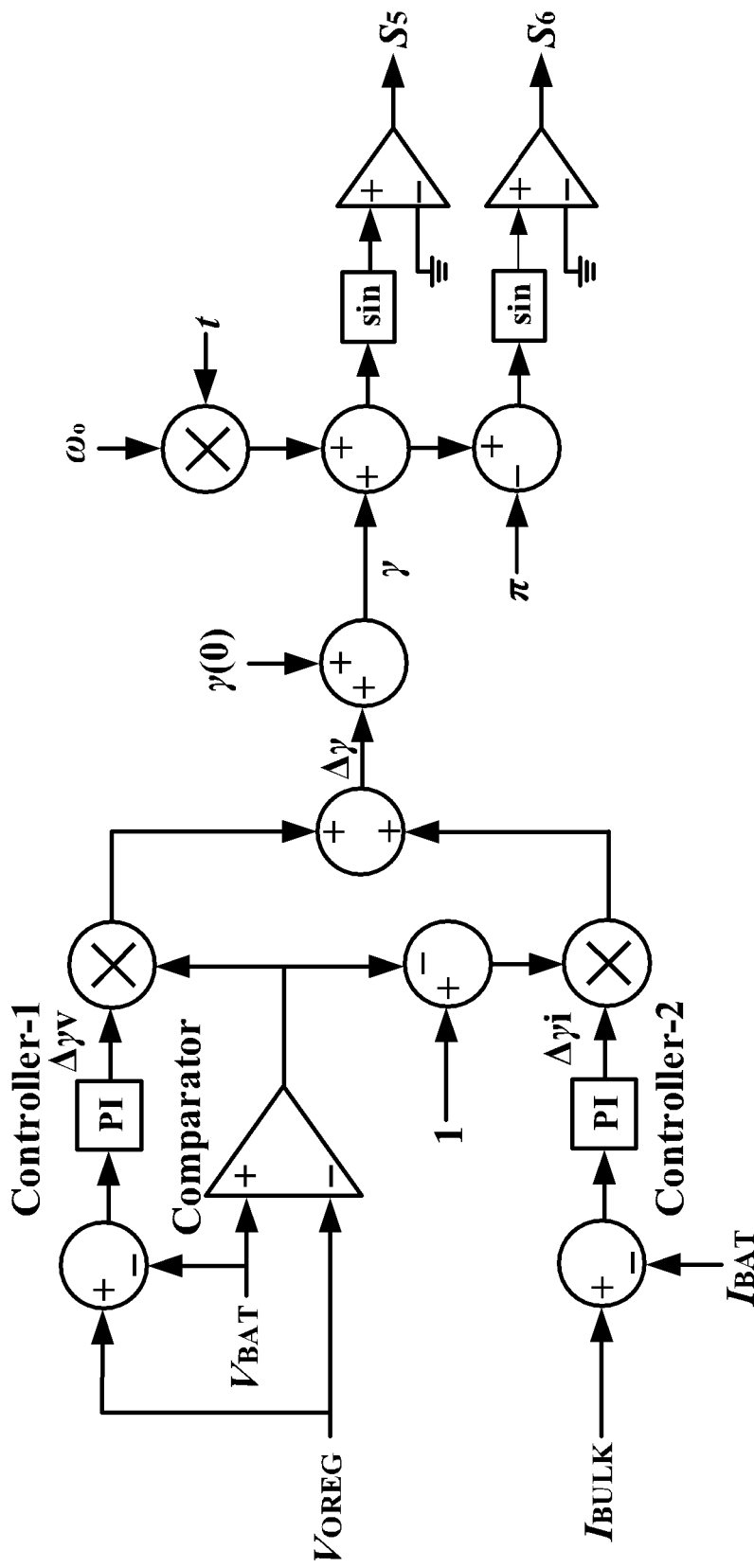
FIG. 14 depicts the disclosed control scheme for the Rx switches $S_5$ and $S_6$ for automatic selection of CC and CV mode.

Section A2: Automatic Signal Synchronization of the Tx Circuit and Rx Circuit and Automatic Change of CV and CV Battery Charging Mode Time synchronization can be achieved by the PI controller without any wireless communication between the Tx and Rx. For example, at any one of the operating points, the phase difference ($\gamma$) between the switching signals $S_1$ and $S_5$ satisfies $0 <= \gamma <= 2\pi$. For $\beta$ satisfying EQNS. (15)-(17) and for a given $\gamma$ at one operating point, the phase shift $\beta$ is unique. The feedback control scheme in FIG. 14 provides an automatic process to find the value of $\gamma$ for a reference output voltage. In FIG. 14, $V_{BAT}$ is the measured battery voltage, $V_{OREG}$ is the pre-set regulated battery voltage reference, $I_{BAT}$ is the measured battery charging current, $I_{BULK}$ is the controlled charging current reference under the CC mode. When $V_{BAT}$ is lower than $V_{OREG}$, the CC mode should be adopted and the charging current $I_{BAT}$ is regulated to $I_{BULK}$. Otherwise (i.e. $V_{BAT} \geq V_{OREG}$) the CV mode should be adopted.

For example, the output voltage is 8V, but the reference is 5V. The output voltage measurement of the wireless charging system should detect that and increase the phase shift $\beta$ (e.g. from 45-degree to 75-degree). According to EQNS. (15)-(17) (a linear relationship between $\beta$ and $\gamma$), $\gamma$ will automatically be regulated to track the output voltage reference (e.g. from 45-degree to 15-degree). Due to the initially $\gamma(0)$ is a constant value in the control strategy, which can any degree in between 0 and $2\pi$ (e.g. 0-degree or 90-degree). Then, $\Delta\gamma$ will be controlled by the PI controller (e.g. from 45-degree to 15-degree for $\gamma(0)$=0-degree and from 315-degree to 285-degree for $\gamma(0)$=90-degree).

In this invention, there is no need to change the operating frequency as a means to change the CC and CV mode. The control block (a sub-control unit within the overall control scheme) that allows the control of the charging mode change. Again, such control block can be implemented in analog form, digital form or a combination of both. The CV mode is controlled by Controller-1, which generates the phase shift angle during $\Delta_{\gamma v}$ during the CV mode. On the contrary, the CC mode is controlled by Controller-2 which provides the phase shift angle during $\Delta_{\gamma i}$ during the CC mode. The choice of CC mode or CV mode is decided by the comparison of $V_{BAT}$ with the reference $V_{OREG}$. The phase-shift angle is given by $$\Delta\gamma = \Delta\gamma v + \Delta\gamma i \quad (22)$$

where: $\Delta\gamma i$ is the change of the phase shift angle between the switching signals $S_1$ and $S_5$ generated by the controller-2 during the CC mode; $\Delta\gamma v$ is the change of the phase shift angle between the switching signals $S_1$ and $S_5$ generated by the controller-1 during the CV mode; and $\Delta\gamma$ is the sum of the of the control signals $\Delta\gamma i$ and $\Delta\gamma v$. When $V_{BAT} < V_{OREG}$, the output of controller-1 becomes 0, the change of the phase shift angle $\Delta\gamma = \Delta\gamma i$, i.e under CC mode. Controller-2 will control the charging current to follow a pre-set current level $I_{BULK}$. When $V_{BAT} \geq V_{OREG}$, the output of Controller-2 becomes 0, the change of the phase-shift angle $\Delta\gamma = \Delta\gamma v$, i.e under CV mode. Controller-1 will control the charging voltage near the preset value of $V_{OREG}$ to charge the battery.

If the battery is deeply discharged and the voltage satisfies $V_{BAT} < V_{BAT(SC)}$ (e.g. $V_{BAT(SC)}$=2.7 V for healthy NCR18650), the wireless charging system enters the deep-pre-charging phase (i.e. $0 < t < t_1$) with the deep-pre-charging current of $I_{BAT(SC)}$. Generally, $I_{BAT(SC)} < 0.05 * I_{BULK}$, where $I_{BULK}$ is the charging current reference of the CC phase.

If the battery voltage satisfies $V_{BAT(SC)} \leq V_{BAT} \leq V_{LOWV}$ (e.g. $V_{LOWV}$=3 V for healthy NCR18650), the wireless charging system enters the pre-charging phase (i.e. $t_1 \leq t \leq t_2$) with the pre-charging current of $I_{PRECHG}$. Generally, $I_{PRECHG} < 0.1 * I_{BULK}$.

If the battery voltage satisfies $V_{LOWV} < V_{BAT} < V_{OREG}$ (e.g. $V_{OREG}$=4.2 V for healthy NCR18650), the wireless charging system enters the CC phase (i.e. $t_2 \leq t \leq t_3$) with the constant-charging current of $I_{BULK}$, where $V_{OREG}$ is the charging voltage reference of the CV phase. Generally, 0.2 C $\leq I_{BULK} \leq 1$ C, where C is the rated capacity of the battery.

If the battery voltage is charged up to $V_{OREG}$, the wireless charging system enters the CV phase (i.e. $t_3 \leq t \leq t_4$) with the constant-charging voltage of $V_{OREG}$. Meanwhile, the charging current gradually reduces until the termination threshold $I_{TERM-TH}$. Once $I_{BAT}$ falls below $I_{TERM-TH}$, the charging stops and the Rx controller sends the information of SoH and charging complete notification to the front-end.

Section A3: Verification with Simulation Results

Figure 16:
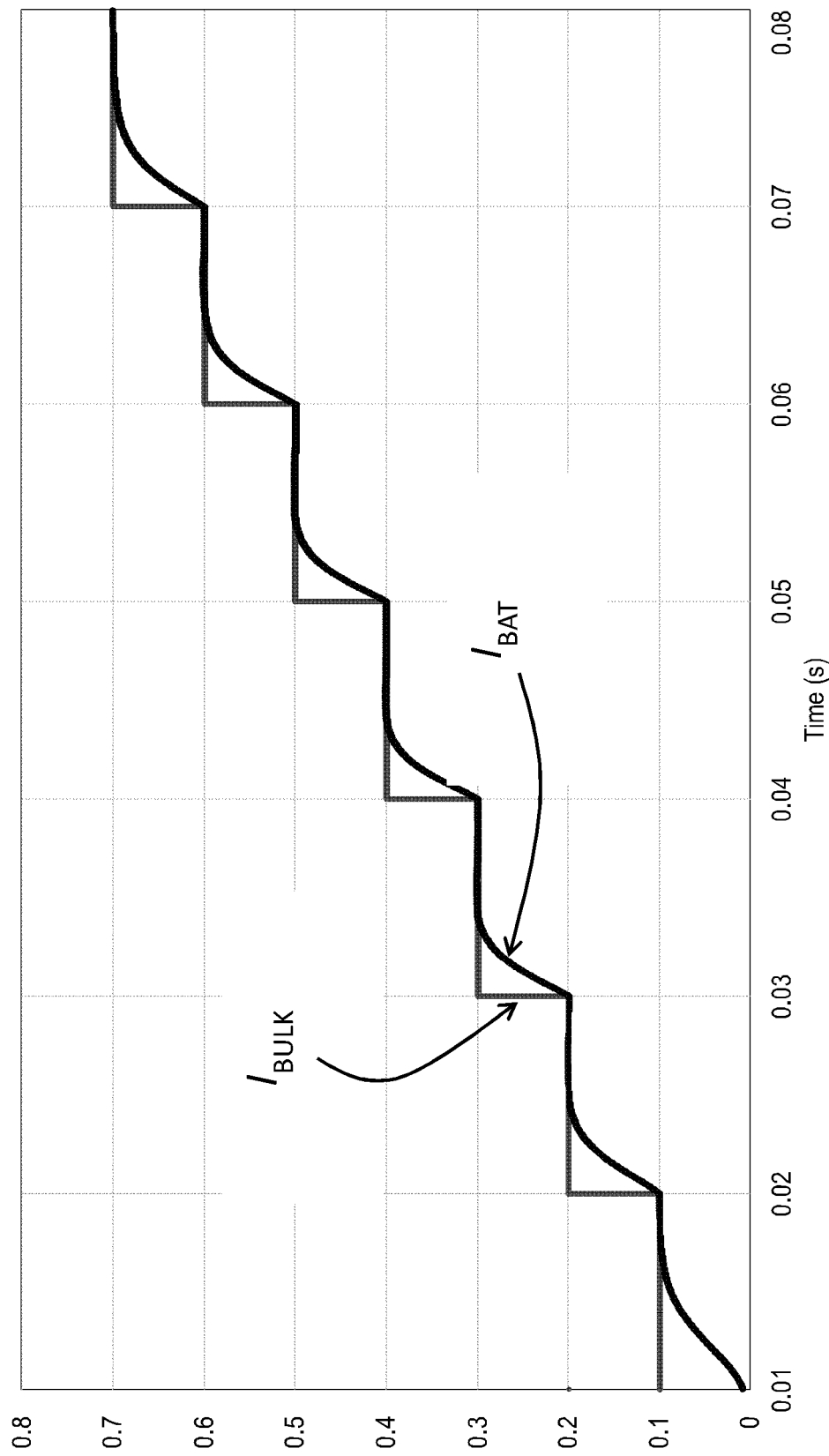
FIG. 16 depicts a plot of simulated battery charging current ($I_{BAT}$) regulated to follow the battery charging current reference ($I_{BULK}$) under the CC charging mode.

In the simulation study, S1 and S2 have a duty cycle of 0.5. They are switched in a complementary manner as shown in FIG. 11. The inverter in the Tx circuit and the Rx circuit are switched at the same constant frequency for battery charging. The evaluation shown in FIG. 16 illustrates how the battery charging current ($I_{BAT}$) can be regulated to follow the battery charging current ($I_{BULK}$). $I_{BULK}$ is increased in steps. In FIG. 16, it can be seen that $I_{BAT}$ can be regulated to $I_{BULK}$. The results in FIG. 16 confirm that the disclosed controller in FIG. 14 can be applied to the wireless charging circuit in FIG. 8 using the Rx circuit of FIG. 10 for CC charging mode.

Figure 17:
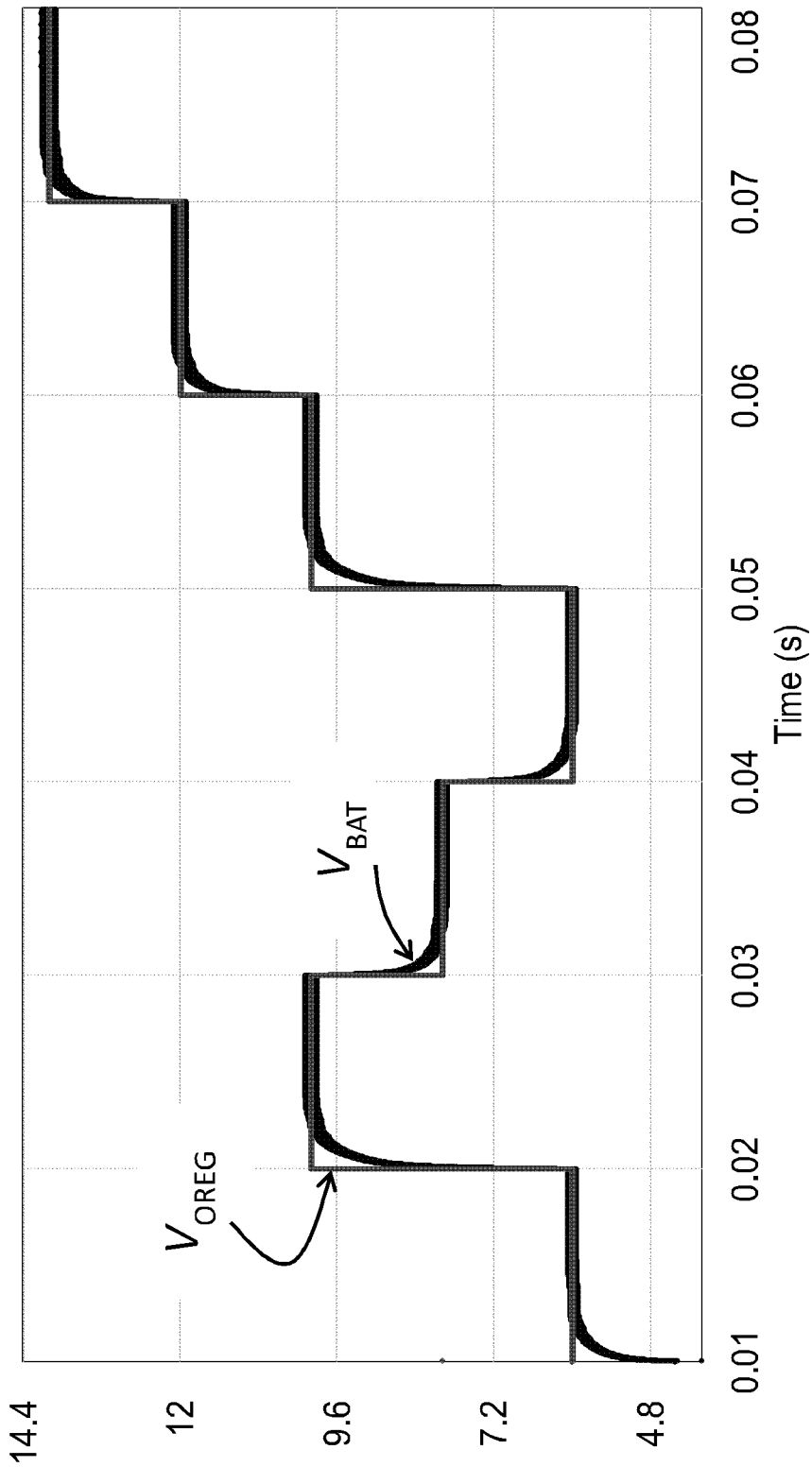
FIG. 17 is a plot of simulated battery charging voltage ($V_{BAT}$) regulated to follow the battery charging voltage reference ($V_{OREG}$) under the CV charging mode, where VOREG is deliberately set at different levels to show that the controller can vary $V_{BAT}$ to follow $V_{OREG}$.

Another simulation study is conducted for the CV mode. The battery voltage reference ($V_{OREG}$) is increased in steps as shown in FIG. 17. It can be seen from FIG. 17 that the battery voltage ($V_{BAT}$) can be regulated to follow $V_{OREG}$. It can therefore be seen that the same controller of FIG. 14 and wireless charging system (FIG. 8 and FIG. 10) can also be adopted for CV charging mode without any change of switching frequency in the Tx and Rx circuits.

Section B: Additional Information Transfer of SoH from the Rx Circuit to the Tx Circuit Besides the normal handshaking functions between the Tx circuit and the Rx circuit, the switches in the Rx circuit can also be used to obtain the SoH to the Tx side for the information of the users. It is important to stress that the switching frequency of the Rx switches for handshaking or communication purposes can be much lower than that for wireless power transfer. Typically, such frequency could be one-tenth of the frequency for wireless power transfer. It is also stressed that the estimation of the SoH is conducted at the end of the charging period (i.e. after the battery is fully charged according to the charging profile in FIG. 15.

While there are many methods of determining the SoH, this section uses the enhanced coulomb counting algorithm as an example. The main element in this section is to demonstrate how SoH, after having been obtained, can be transferred to the Tx side as information either for control purposes or for the information of the consumers.

Section B1: Analysis: Estimation of SoH Based on Enhanced Coulomb Counting Algorithm SoC is defined as the percentage of the releasable capacity ($C_{releasable}$) relative to the battery rated capacity ($C_{rated}$), viz., $$SoC = \frac{C_{relesable}}{C_{rated}} \times 100\%. \quad (23)$$

A fully charged battery has the maximum releasable capacity ($C_{max}$), which can be different from the rated capacity. It can be used for evaluating the SoH of the battery. It gives $$SoH = \frac{C_{max}}{C_{rated}} \times 100\%. \quad (24)$$

The Depth of Discharge (DoD) can be expressed as the percentage of the capacity that has been discharged relative to $C_{rated}$. Hence, $$DoD = \frac{C_{released}}{C_{rated}} \times 100\% \quad (25)$$

where $C_{released}$ is the capacity discharged by any amount of current.

With a measured charging and discharging current ($I_{BAT}$), the difference of the DoD in an operating period ($\tau$) can be calculated by $$\Delta DoD = \frac{-\int_{t_0}^{t_0+\tau} I_{BAT}(t)dt}{C_{rated}} \times 100\% \quad (26)$$

where $I_{BAT}$ is positive for charging. As time elapsed, DoD is accumulated, so that $$DoD(t)=DoD(t_0)+\eta_c \Delta DoD \quad (27)$$

where $\eta_c$ is the charging efficiency. Then $$SoC(t)=SoH(t)-DoD(t). \quad (28)$$

The SoH can be re-evaluated when the battery is fully charged if $V_{BAT}$ reaches the upper limit $V_{OREG}$ and $I_{BAT}$ declines the lower limit $I_{TERM-Th}$. A new SoH is obtained by accumulating the sum of the total charge put into the battery and is then equal to SoC. (Reference: A Closer Look at State of Charge (SOC) and State of Health (SOH) Estimation Techniques for Batteries.)

Figure 18:
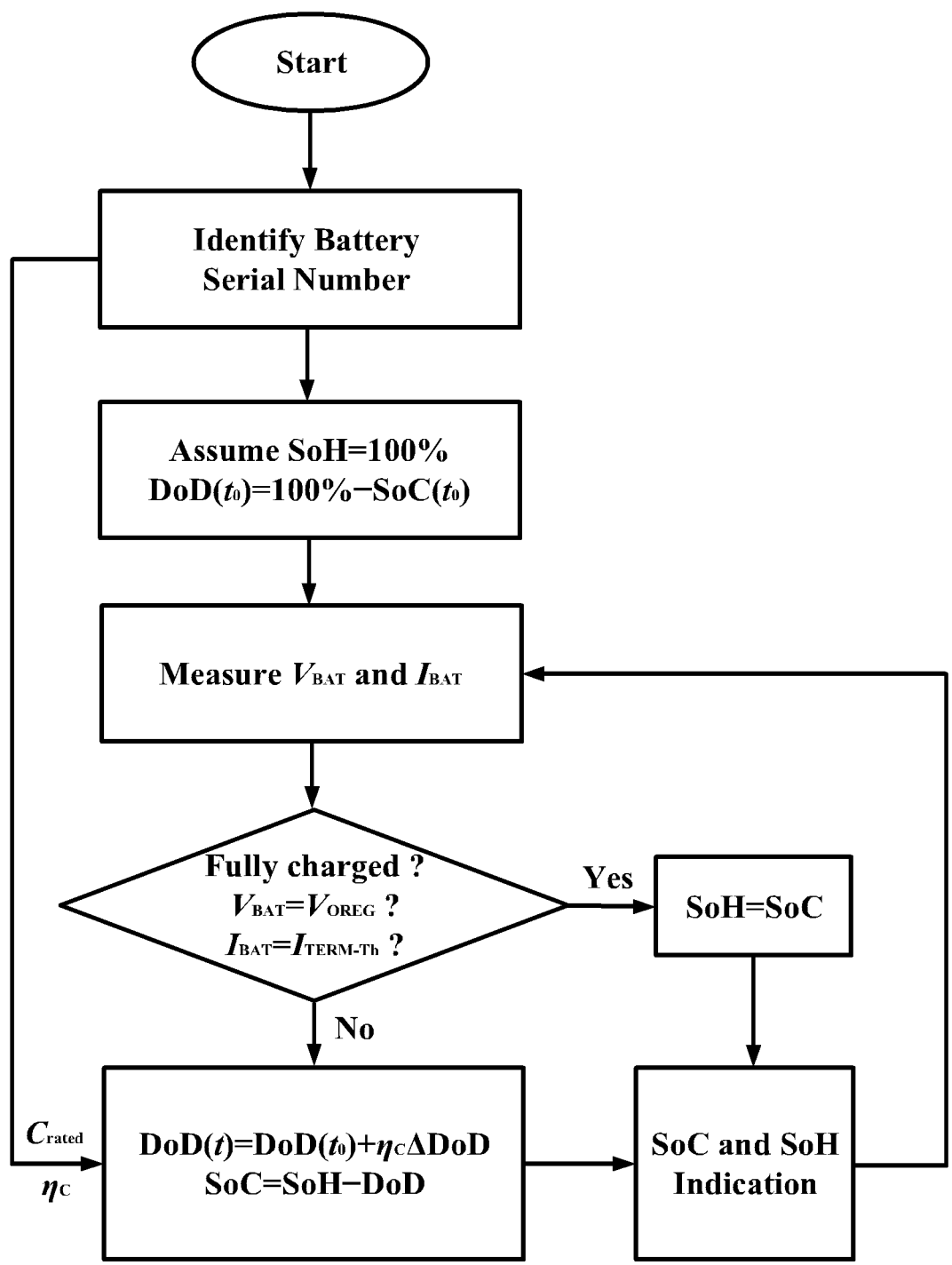
FIG. 18 is a flowchart showing steps of a process performed by the Rx controller to estimate SoH of the battery load.

The procedure of estimating the SoH is depicted in the flowchart in FIG. 18. It is summarized as follows.

When $V_{BAT}=V_{OREG}$, $I_{BAT}=I_{TERM-Th}$, SoH=SoC, the battery is fully charged.

Close both $S_5$ and $S_6$ and let the battery stand for a while.

Measure $V_{BAT}$ as open circuit voltage and battery temperature T, the SoH of the battery can be estimated using a LUT, which is more accurate than other methods. It gives $$SoH=LUT(V_{BAT},T). \quad (29)$$

The SoH of the battery load SoH($t_0$) ranges from 0 to 1, while the duty ratio of the switching signal $S_5$ also ranges from 0 to 1. Therefore, by modulating the switches $S_5$ with the duty ratio $D_R$=SoH, the information of the SoH of the battery load can be encoded in the power flow and decoded from the measurements of the transmitting current $i_p$, or the voltage over the compensated capacitor or the coil. The duty ratio of the pulsing $i_p$ is $D_{ip}$, $D_{ip}+D_R=1$. Then, SoH=1-$D_{ip}$.

Section B2: Wireless Transfer of SoH Information to the Tx Side

Once the SoH value has been obtained, such information can be transferred through the relatively low-frequency switching of the Rx switches to the Tx circuit. The mechanism is now described with the aid of the simplified circuit in FIG. 19, the functional block diagram in FIG. 20 and a set of system waveforms in FIG. 21. The essence of this mechanism is to use the switching actions of both of the Tx switches and the Rx switches in such a way that the SoH can be derived from the fundamental current ($i_{p1}$) of the primary current ($i_{p1}$).

Figure 19:
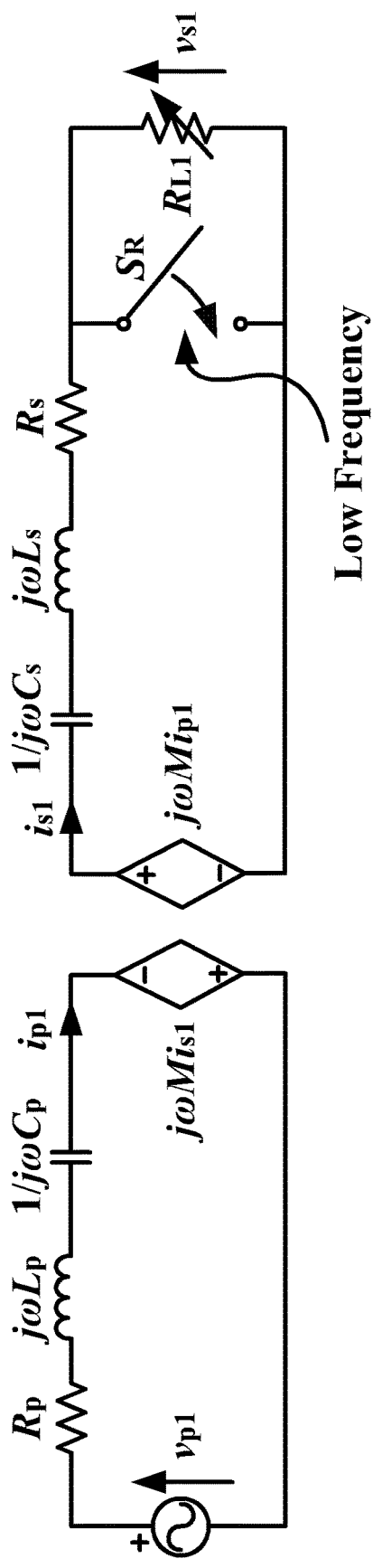
FIG. 19 depicts transferring the SoH information by switching the Rx switch.
Figure 21:
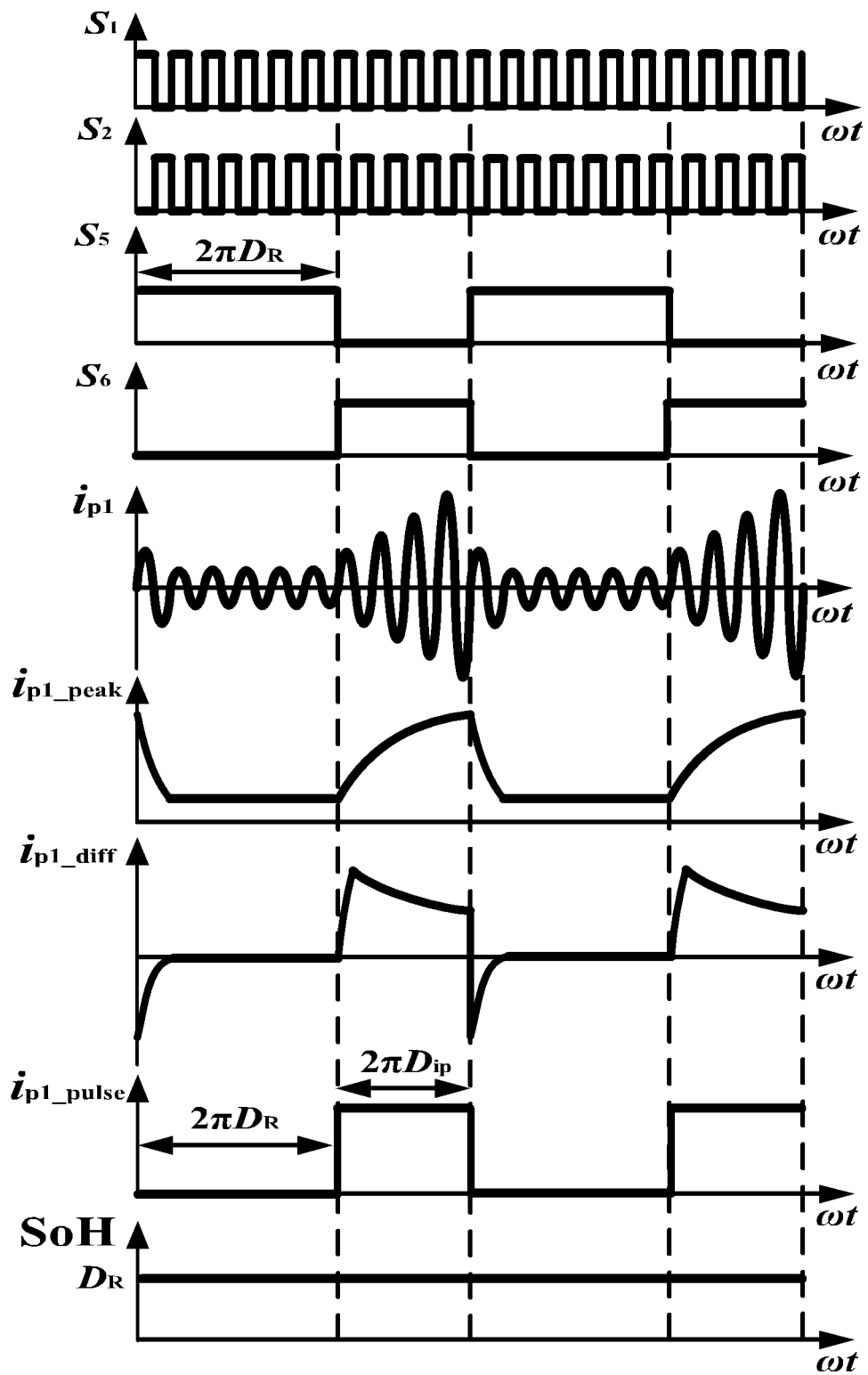
FIG. 21 depicts a set of system waveforms in the process of deriving the State-of-Health (after the charging process has ended).

The bidirectional switches SR in FIG. 19 (comprising S5 and S6 in FIG. 10) of the Rx circuit are switched at a relatively low frequency when compared with the Tx switches S1 and S2 as indicated in FIG. 21. The Tx switches $S_1$ and $S_2$ are still switched at the resonant frequency with the duty ratio of 0.5.

Figure 20:
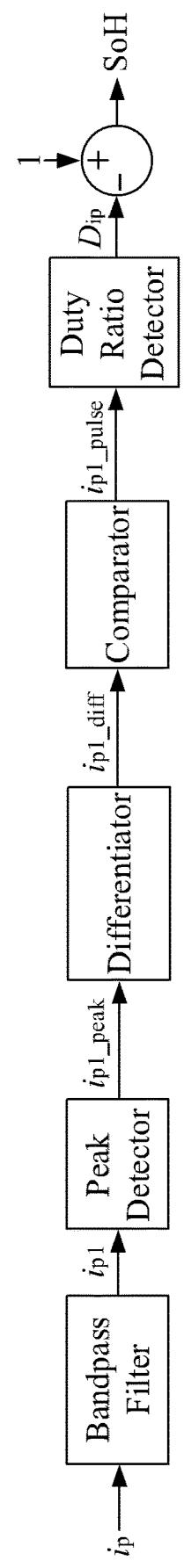
FIG. 20 depicts a functional block diagram showing the steps of deriving the SoH.

The steps of deriving the SoH value are given as follows.
1. Use a bandpass filter to obtain the fundamental component of $i_p$ at the resonant frequency (i.e. $i_{p1}$) (FIG. 20). Due to the switching of $S_5$ and $S_6$ with low frequency, $i_{p1}$ correspondingly varies with low frequency.
2. Detect the peak value (envelope) or RMS value of $i_{p1}$ (i.e. $i_{p1\_peak}$). Due to $i_{p1}$ is a sinusoidal waveform, the peak value or RMS value can be easily obtained.
3. Use a differentiator on current envelope $i_{p1\_peak}$ to obtain $i_{p1\_diff}$, which then is compared to the zero-voltage level or ground to have $i_{p1\_pulse}$. (Note: $i_{p1\_peak}$ forms the "envelope" of $i_{p1}$.)
4. Use a duty ratio detector (e.g. pulse-width counter) to obtain the duty ratio of $i_{p1\_pulse}$ (i.e. $D_{ip}$).
5. Calculate the SoH based on $$SoH = 1 - D_{ip}. \quad (30)$$

Figure 22:
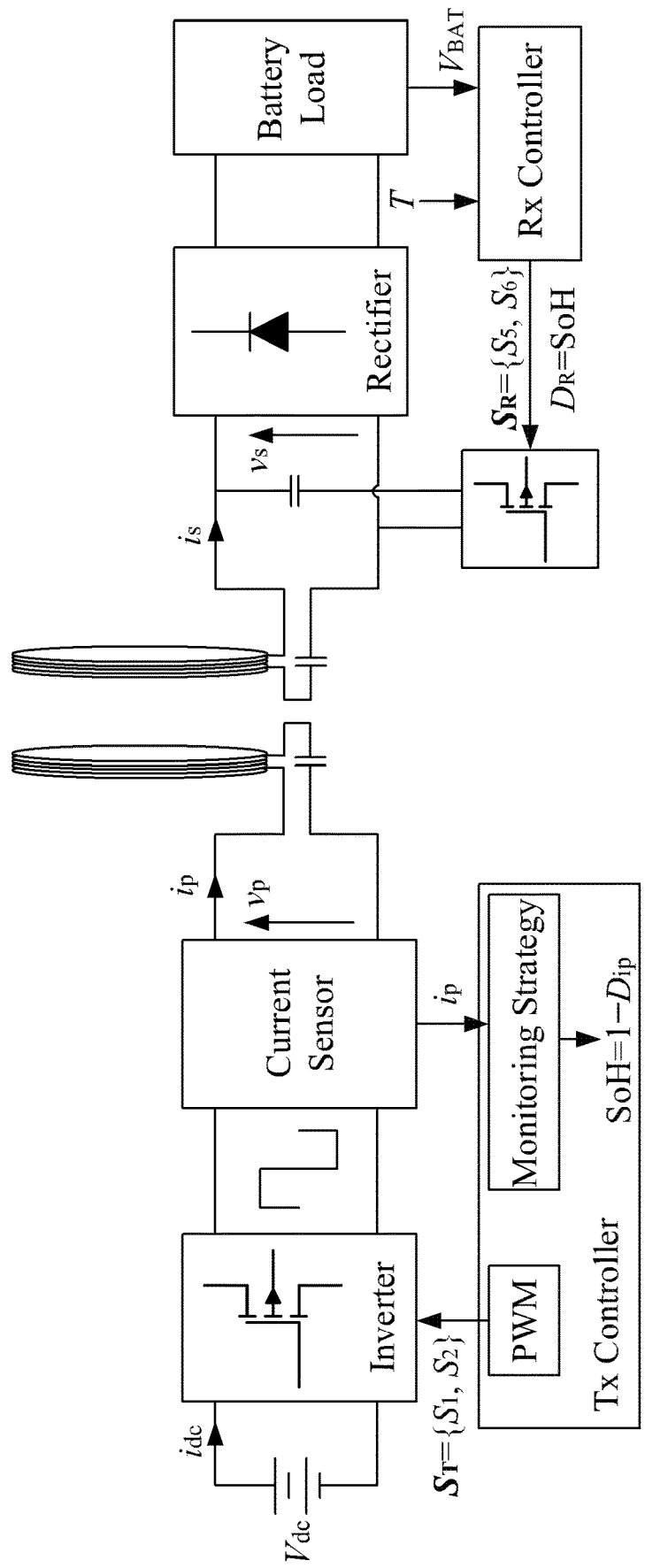
FIG. 22 depicts a block diagram of the disclosed wireless charging system in accordance with an exemplary embodiment of the present invention.

The general block diagram of the disclosed wireless charging system with the following features is shown in FIG. 22. The system is featured:
1. without the need for a wireless communication system;
2. with constant switching frequency for both of the Tx circuit (power inverter) and Rx circuit for both CC mode and CV charging mode during the wireless charging process;
3. with the coordinated switching of both of the Tx circuit and the Rx circuit with automatic synchronization;
4. with the ability to monitor the SoH of the battery at the end of the charging process; and
5. with the ability of transferring the SoH value to the Tx circuit.

Figure 23A:
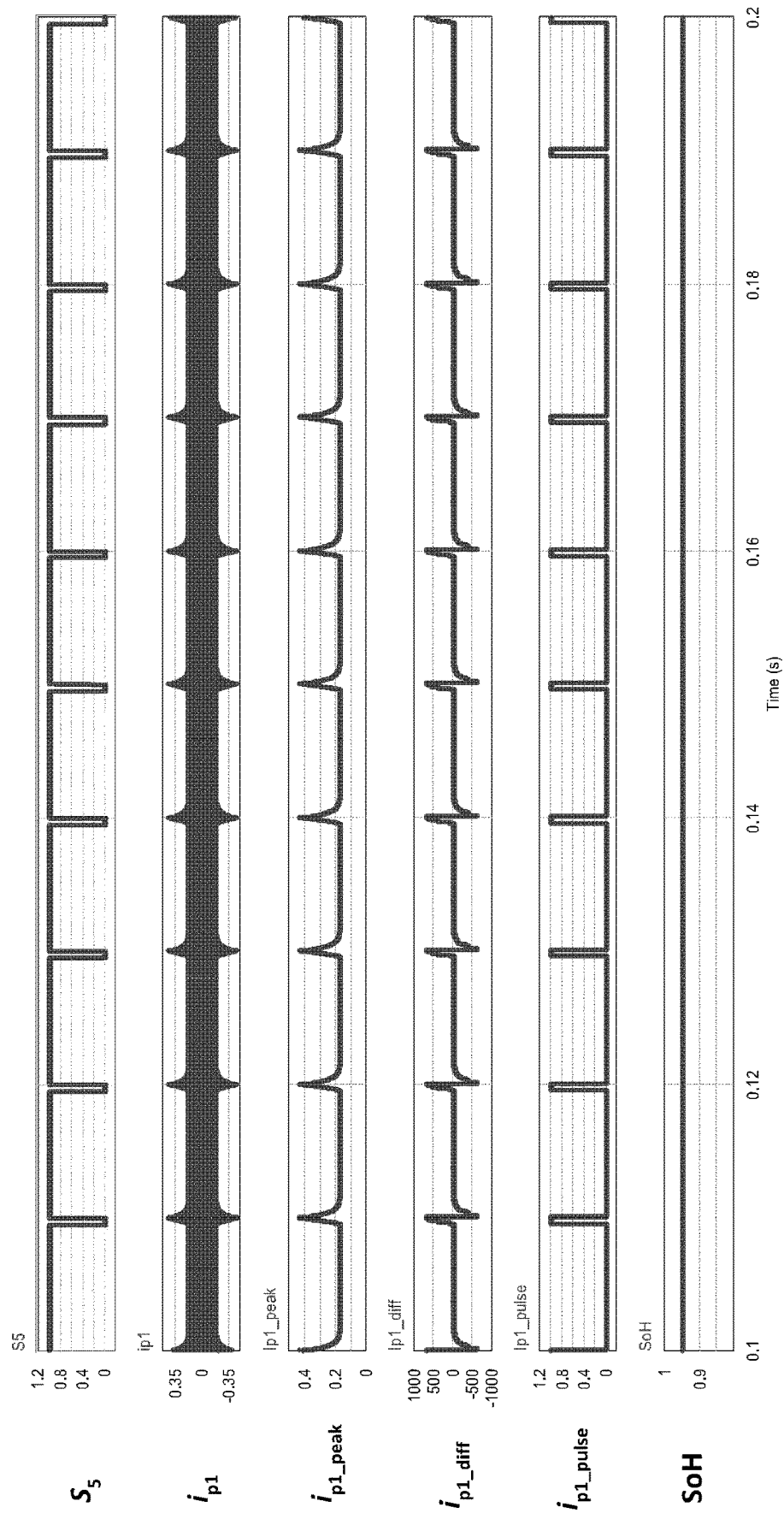
FIG. 23A depicts simulated waveforms of relevant signals for SoH=0.95.
Figure 23B:
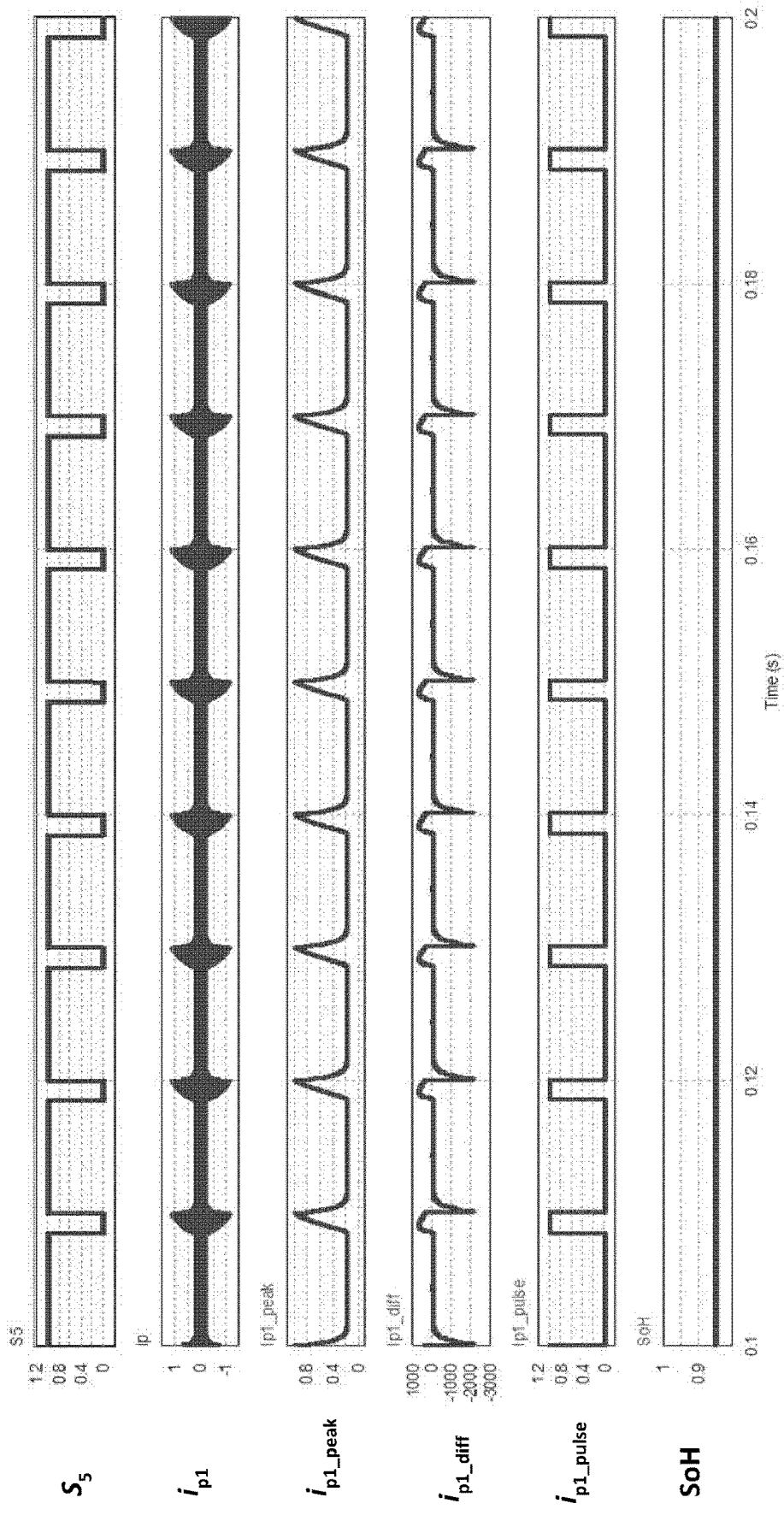
FIG. 23B depicts simulated waveforms of relevant signals for SoH=0.85.

Some simulations results are given. The switching frequency of the Rx is millesimal of the switching frequency of the Tx (i.e. $\omega_R = \omega_o/1000$ or $f_R = f_o/1000$). Based on the disclosed methods, two case studies of SoH=0.95 and SoH=0.85 have been conducted. The simulated waveforms of the relevant signals are: displayed in FIG. 23A and FIG. 23B, respectively. From these two sets of results, the SoH values match the targeted SoH values.

Section C: The Present Invention

The present invention is developed according to the embodiments disclosed above with further elaboration.

A first aspect of the present invention is to provide a wireless charging system for wirelessly charging a battery. The disclosed wireless charging system is exemplarily explained hereinafter with the aid of FIG. 7 and FIG. 8, both of which depict exemplary embodiments of the present invention.

A wireless charging system (700 for the one shown in FIG. 7, 800 for the one shown in FIG. 8) for wirelessly charging a battery 780, 880 comprises a transmitter circuit 701, 801, a receiver circuit 702, 802, a transmitter controller 720, 820 and a receiver controller 750, 850. The battery 780, 880 may be a single rechargeable battery, or a series connection of plural rechargeable batteries, or any form of arrangement of plural rechargeable batteries that results in a single equivalent battery. The transmitter circuit 701, 801 comprises a power inverter 710, 810 used for driving a primary coil 730, 830 connected in series with a first resonant capacitor 732, 832. The receiver circuit 702, 802 comprises a secondary coil 740, 840 connected in series with a second resonant capacitor 742, 842 and a diode rectifier 755, 855. An output of the diode rectifier 755, 855 is arranged to drive the battery 780, 880 directly without using an extra battery charging circuit to select a CC charging mode or a CV charging mode to charge the battery 780, 880. The receiver circuit 702, 802 further comprises a bidirectional switch 745, 845 having a dual function of charging the battery 780, 880 and handshaking with the transmitter circuit 701, 801. The transmitter controller 720, 820 is configured to control the power inverter 710, 810 to switch at a constant and high frequency during normal wireless power transfer, and is further configured to receive information generated from switching actions of the bidirectional switch 745, 845 of the receiver circuit 702, 802 during handshaking. The receiver controller 750, 850 is configured to: control the receiver circuit 702, 802 to switch at a constant and high frequency during normal wireless power transfer, and to switch at a low frequency to generate the information during a handshaking process; compare a battery voltage ($V_{BAT}$) with a battery voltage threshold ($V_{OREG}$) and a battery charging current ($I_{BAT}$) with a charging current reference ($I_{BULK}$) so as to automatically select the CC charging mode or the CV charging mode; and configure the receiver circuit 702, 802 to switch at the same constant and high frequency with the transmitter circuit 701, 801 during a battery charging process.

In certain embodiments, the transmitter controller 720, 820 and the receiver controller 750, 850 are co-configured to perform at least the battery charging process and the handshaking process such that wireless power is transferred from the primary resonator (formed by the primary coil 730, 830 and first resonant capacitor 732, 830) to the secondary resonator (formed by the secondary coil 740, 840 and second resonant capacitor 742, 842) during the battery charging process and such that communication and compatibility checking between the transmitter circuit 701, 801 and the receiver circuit 702, 802 occur during the handshaking process.

In certain embodiments, the bidirectional switch 745, 845 is configured to perform handshaking with the transmitter circuit 701, 801 so as to inform the transmitter circuit 701, 801 whether the CC charging mode or the CV charging mode is selected to charge the battery.

In certain embodiments, both the transmitter circuit 701, 801 and the receiver circuit 702, 802 are switched at the same high frequency during the battery charging process, while the transmitter circuit 701, 801 is switched at the same high frequency and the receiver circuit 702, 802 is switched at a relatively low frequency during the handshaking process.

The power inverter 710, 810 may be a full-bridge inverter, a half-bridge inverter or a multilevel inverter.

In certain embodiments, the high frequency is set at a resonant frequency of the secondary resonator or at a frequency slightly higher than the resonant frequency of the secondary resonator so as to achieve soft switching in the power inverter.

In certain embodiments, the receiver circuit 702, 802 further comprises a first mechanism configured to determine a State-of-Health of the battery 780, 880 after the battery 780, 880 is fully charged, and a second mechanism configured to transfer information related to a State-of-Charge to the transmitter circuit 701, 801.

In certain embodiments, the transmitter circuit 701, 801 and the receiver circuit 702, 802 are arranged to have switching signals of the transmitter circuit 701, 801 and receiver circuit 702, 802 automatically synchronized at the same high frequency during the battery charging process without using a wireless communication system for feedback and synchronization purposes.

A second aspect of this invention is to provide a method for wirelessly charging a battery.

Figure 15:
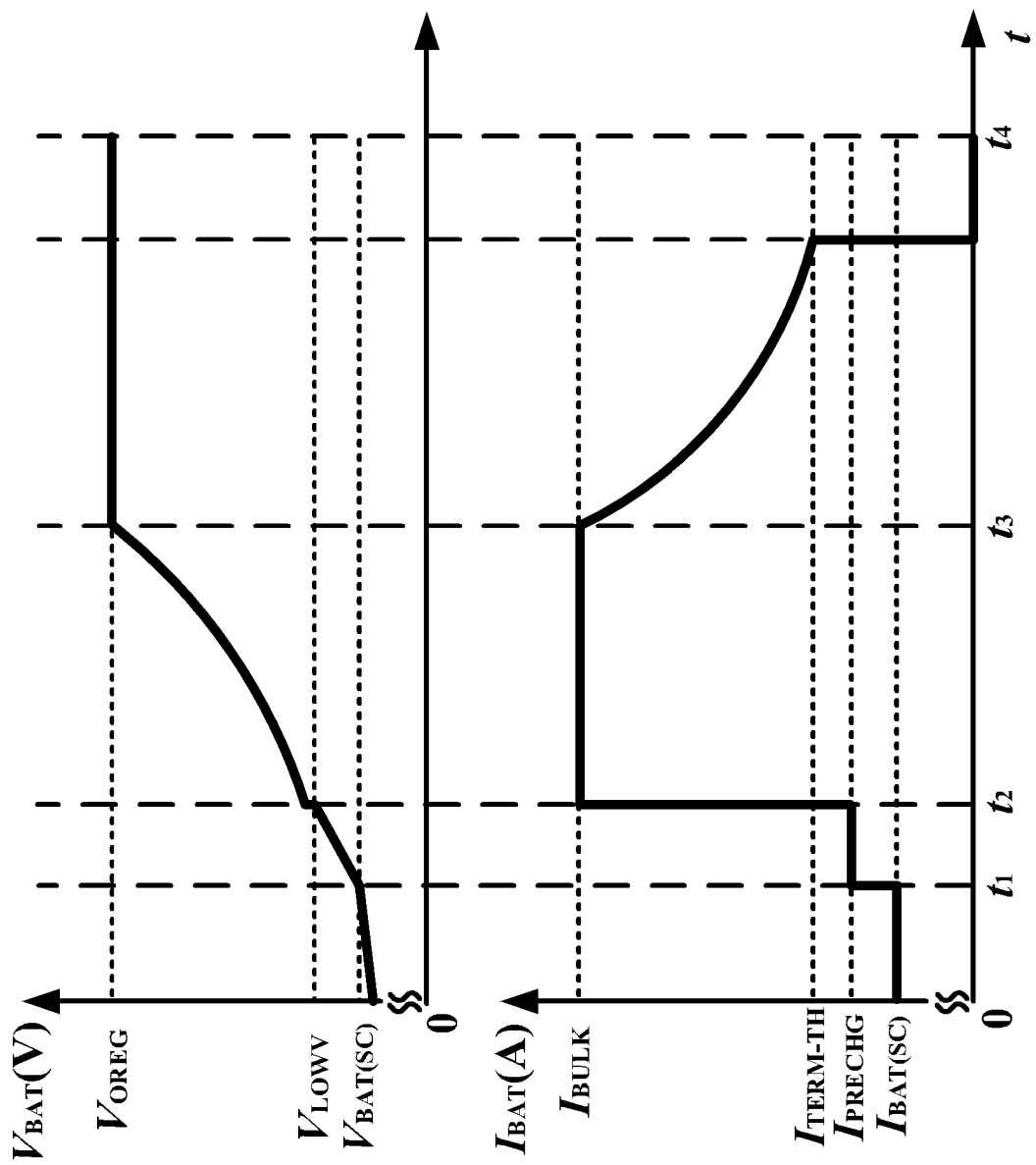
FIG. 15 depicts a diagram of the detailed battery charging processes.

The method comprises: providing the wireless charging system according to any of the embodiments as disclosed above in the first aspect of this invention (such as the system 700 or the system 800); automatically selecting the CC mode and regulating the battery charging current to a value of $I_{BAT(SC)}$ or $I_{PRECHG}$ or $I_{BULK}$ according a battery voltage in a battery charging profile of FIG. 15 when the battery voltage VBAT is less than a battery voltage threshold ($V_{OREG}$); and automatically selecting the CV mode and regulating the battery voltage to $V_{OREG}$ when $V_{BAT}$ is larger than or equal to $V_{OREG}$.

In certain embodiments, the method further comprises: configuring both of the transmitter circuit 701, 801 and the receiver circuit 702, 802 to switch at the same high frequency during the battery charging process; and configuring the transmitter circuit 701, 801 to switch at the same high frequency and the receiver circuit 702, 802 to switch at a relatively low frequency during the handshaking process.

In certain embodiments, the method further comprises: controlling the receiver circuit 702, 802 to switch at the constant and high frequency during normal wireless power transfer, and to switch at the low frequency to generate the information during the handshaking process; comparing the battery voltage ($V_{BAT}$) with the battery voltage threshold ($V_{OREG}$) and the battery charging current ($I_{BAT}$) with the charging current reference ($I_{BULK}$) so as to automatically select the CC charging mode or the CV charging mode; and configuring the receiver circuit 702, 802 to switch at the same constant and high frequency with the transmitter circuit 701, 801 during the battery charging process.

In certain embodiments, the method further comprises: determining a State-of-Health of the battery 780, 880 after the battery 780, 880 is fully charged; and transferring information related to a State-of-Charge to the transmitter circuit 701, 801.

In certain embodiments, the method further comprises automatically synchronizing switching signals of the transmitter circuit 701, 801 and receiver circuit 702, 802 at the same high frequency during the battery charging process without using a wireless communication system for feedback and synchronization purposes.

Section D: Application of the Present Invention in High Power Applications (for Example, EV)

Figure 24A:
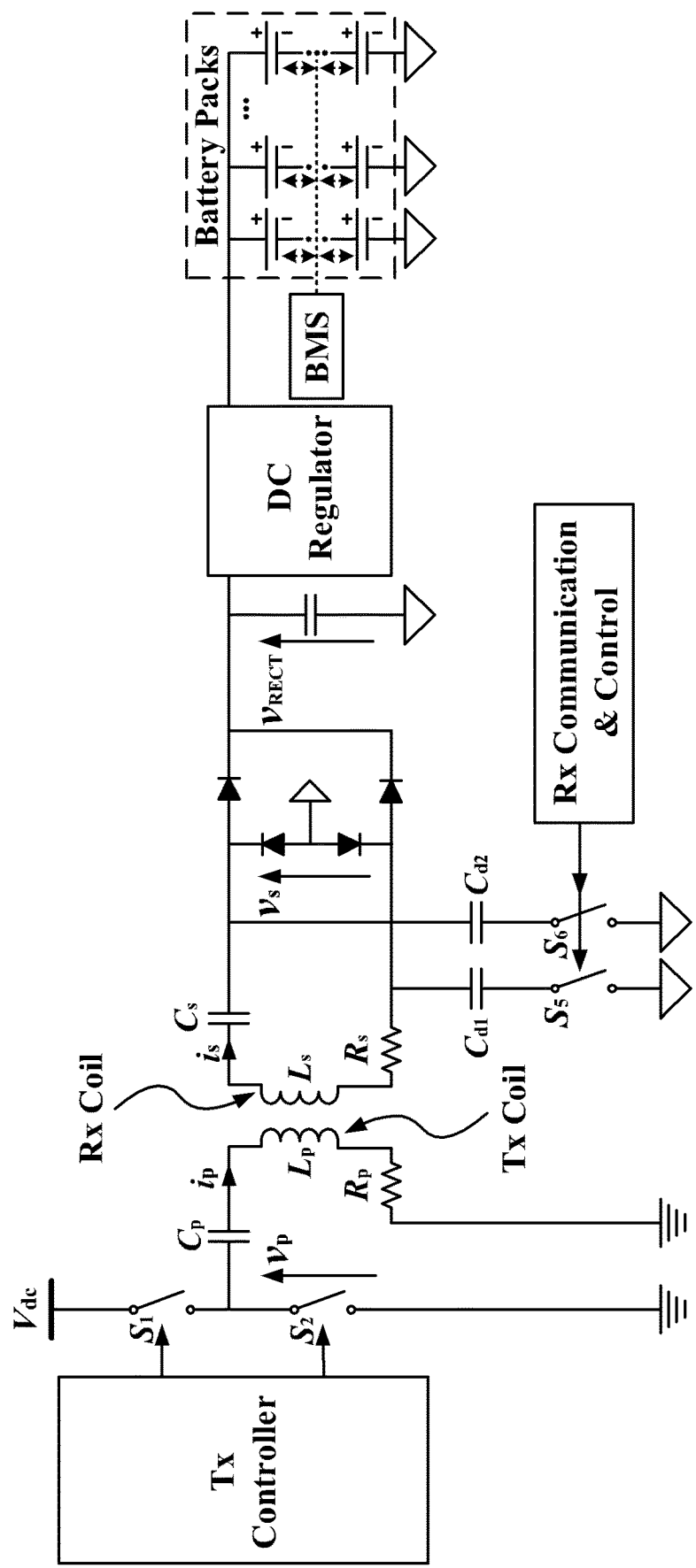
FIG. 24A depicts a conventional example of a high power wireless power transfer (WPT) system with a battery management system (BMS).

FIG. 24A depicts a conventional example of a high power WPT system with a BMS. As shown in FIG. 24A, a DC regulator is always required by the conventional WPT systems for high power applications (i.e., EV) even a battery management system (BMS) is adopted. The function of the DC regulator is to regulate the charging current and voltage of the battery packs (i.e., $I_{BAT}$ and $V_{BAT}$), whereas the BMS is to balance the SoC of each cell in the battery packs.

Figure 24B:
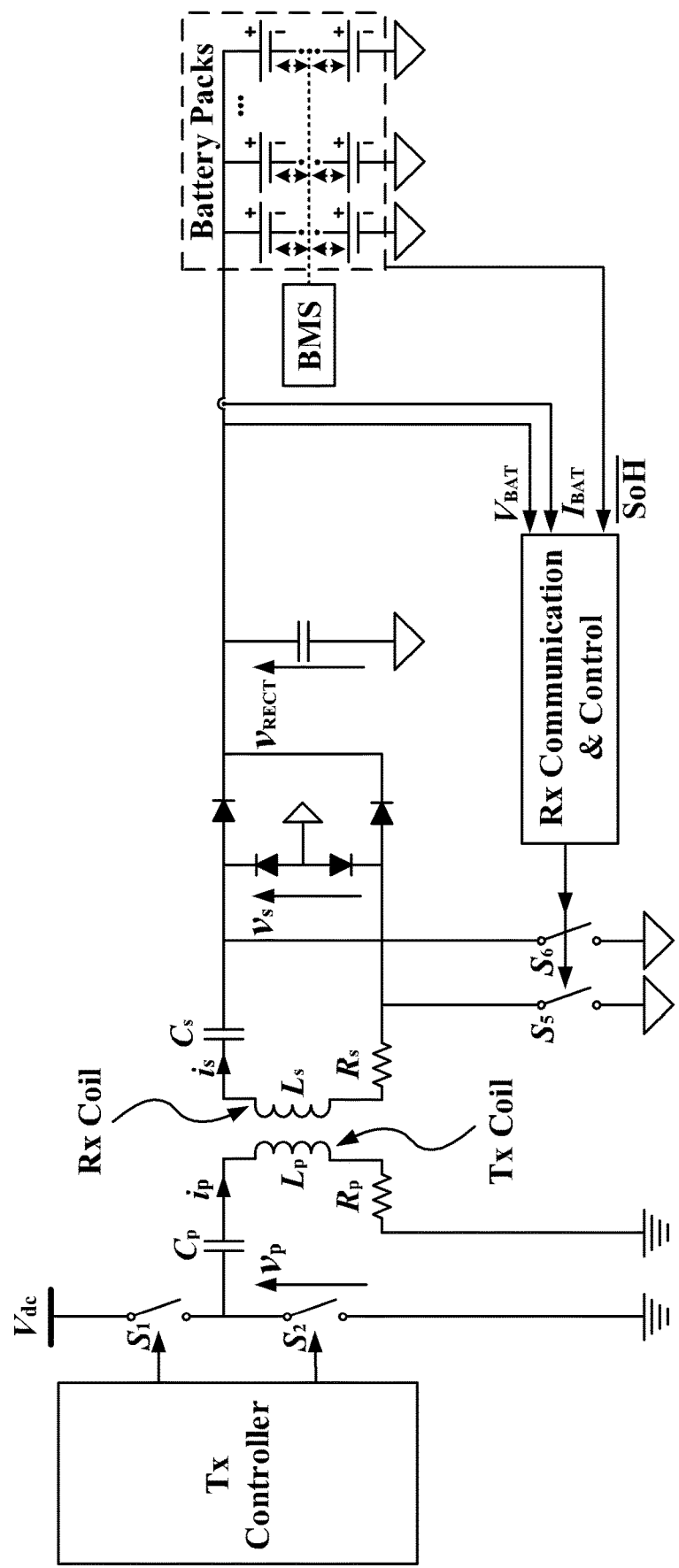
FIG. 24B depicts a third implementation embodiment of the disclosed wireless battery charging system for high power applications in accordance with certain embodiments of the present invention.
Figure 24C:
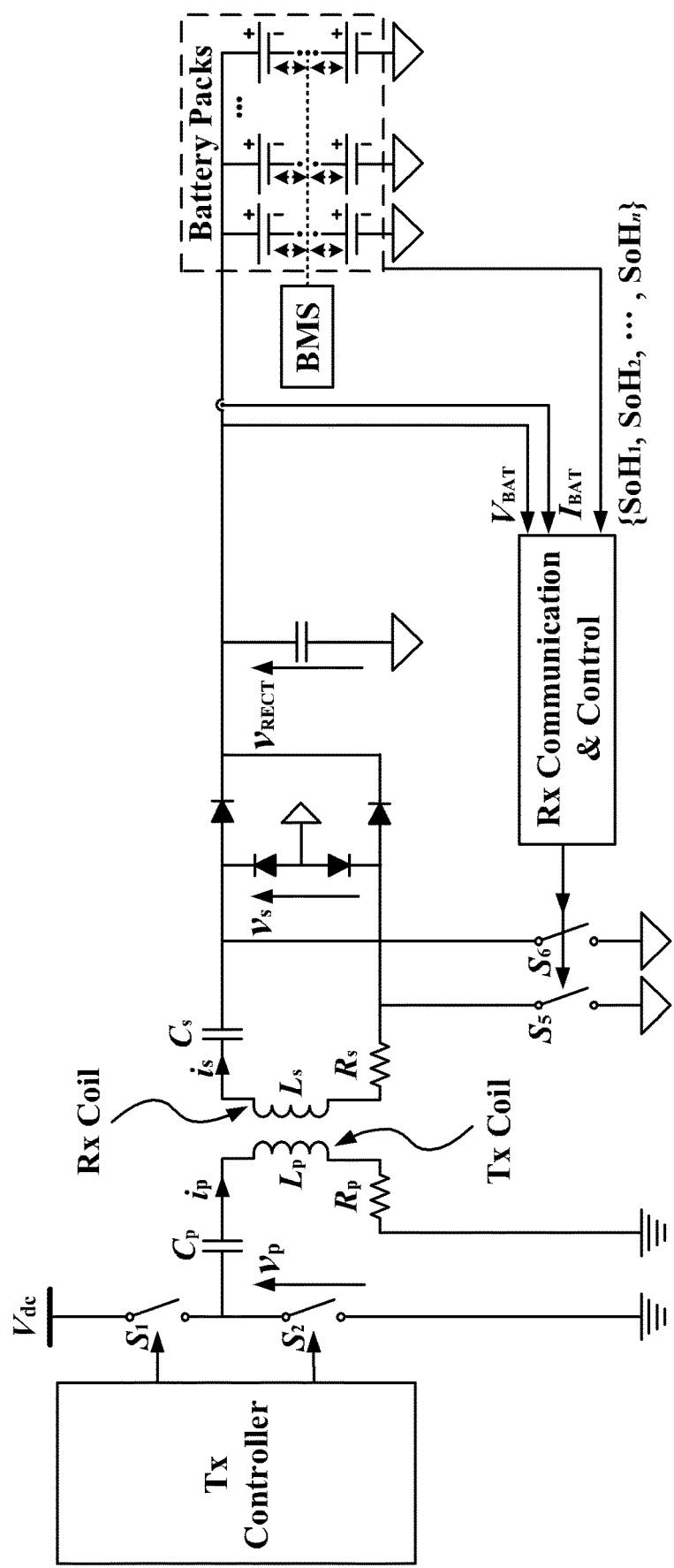
FIG. 24C depicts a fourth implementation embodiment of the disclosed wireless battery charging system for high power applications in accordance with certain embodiments of the present invention.

FIG. 24B and FIG. 24C depict a third and a fourth implementation embodiments of the disclosed wireless battery charging system for high power applications. As shown in FIG. 24B and FIG. 24C, the proposed strategy in the Section A of the present invention still validates to control the charging current voltage of the entire battery pack.

For the Section B of the present invention, the proposed strategy can be directly used to transmit the information of the average SoH (i.e., $\overline{SoH}$) of the entire battery pack to the primary side of high power WPT systems, as shown in FIG. 24B. The strategy can also be extended to transmit SoH of each cell to the front-end by pre-defined sequential (i.e., $SoH=\{SoH_1, SoH_2, \ldots, SoH_n\}$), as shown in FIG. 24C.

Figure 24D:
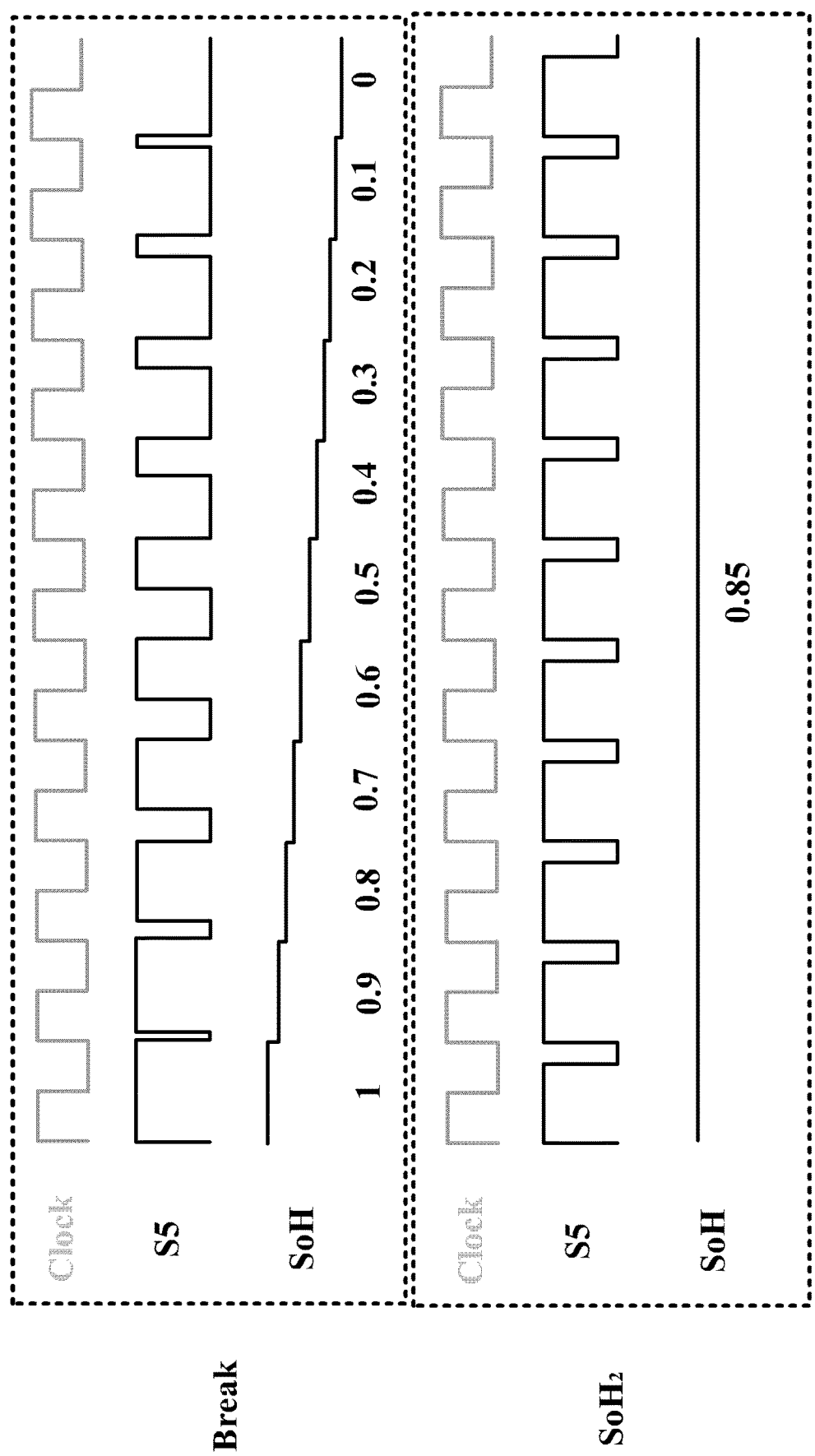
FIG. 24D depicts an example of transmission of a sequential of SoHs of cells of a battery pack.
Figure 24D:
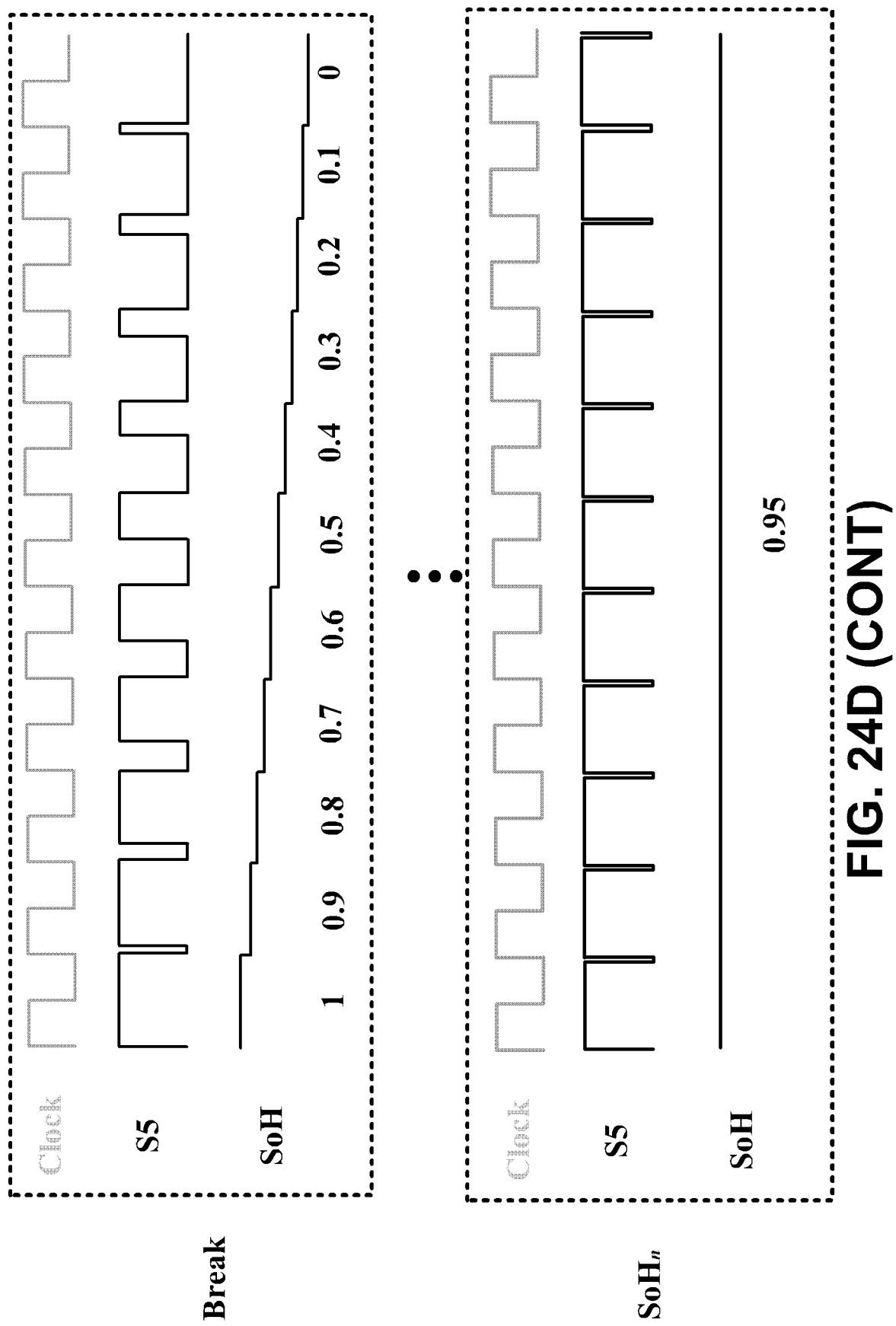
Figure 24D:
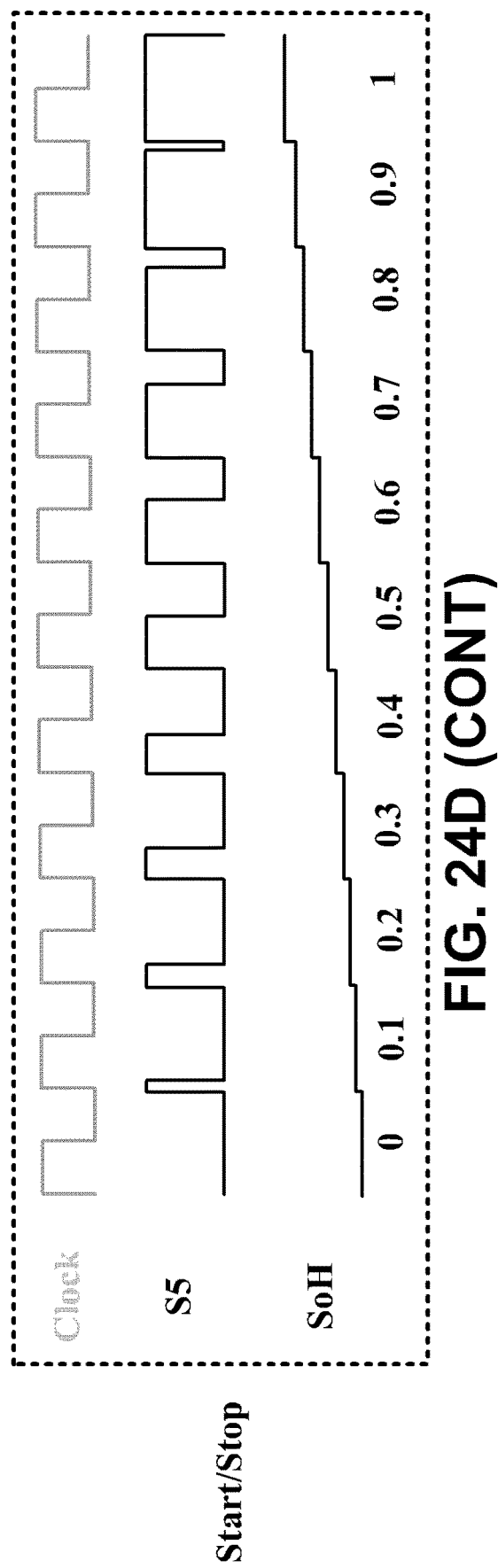

An example of transmitting a sequential of SoHs of the cells is illustrated in FIG. 24D. As shown in FIG. 24D, if the detected SoH values at the primary side is a sequence from 0 to 1 with the interval of 0.1, it means the monitoring of SoH of each cell starts or stops; if the detected SoH values at the primary side is a sequence from 1 to 0 with the interval of 0.1, it means a break between the two monitoring; and if the detected SoH values at the primary side is constant value in N cycles (i.e., N=11 in this example), it means the SoH of the n-th cell (i.e., n=1,2, . . . , n). Therefore, in this example, the SoH of the 1st-cell is 0.5, the SoH of the 2nd-cell is 0.85, and the SoH of the n-th cell is 0.95.

While exemplary embodiments have been presented in the foregoing detailed description of the invention, it should be appreciated that a vast number of variations exist. It should further be appreciated that the exemplary embodiments are only examples, and are not intended to limit the scope, applicability, operation, or configuration of the invention in any way. Rather, the foregoing detailed description will provide those skilled in the art with a convenient road map for implementing an exemplary embodiment of the invention, it being understood that various changes may be made in the function and arrangement of steps and method of operation described in the exemplary embodiment without departing from the scope of the invention as set forth in the appended claims.

What is claimed is:

1. A wireless charging system for wirelessly charging a battery, the system comprising:
    a transmitter circuit comprising a power inverter used for driving a primary coil connected in series with a first resonant capacitor;
    a receiver circuit comprising:
        a secondary coil connected in series with a second resonant capacitor and a diode rectifier, an output of the diode rectifier being arranged to drive the battery directly without using an extra battery charging circuit to select a constant-current (CC) charging mode or a constant-voltage (CV) charging mode to charge the battery; and
        a bidirectional switch having a dual function of charging the battery and handshaking with the transmitter circuit;
    a transmitter controller configured to control the power inverter to switch at a constant and high frequency during normal wireless power transfer, and further configured to receive information generated from switching actions of the bidirectional switch of the receiver circuit during handshaking; and
    a receiver controller configured to:
        control the receiver circuit to switch at a constant and high frequency during normal wireless power transfer, and to switch at a low frequency to generate the information during a handshaking process;
        compare a battery voltage ($V_{BAT}$) with a battery voltage threshold ($V_{OREG}$) and a battery charging current ($I_{BAT}$) with a charging current reference ($I_{BULK}$) so as to automatically select the CC charging mode or the CV charging mode; and
        configure the receiver circuit to switch at the same constant and high frequency with the transmitter circuit during a battery charging process.

2. The system of claim 1, wherein the transmitter controller and the receiver controller are co-configured to perform at least the battery charging process and the handshaking process such that wireless power is transferred from the primary resonator to the secondary resonator during the battery charging process and such that communication and compatibility checking between the transmitter circuit and the receiver circuit occur during the handshaking process.

3. The system of claim 2, wherein both the transmitter circuit and the receiver circuit are switched at the same high frequency during the battery charging process, while the transmitter circuit is switched at the same high frequency and the receiver circuit is switched at a relatively low frequency during the handshaking process.

4. The system of claim 2, wherein the transmitter circuit and the receiver circuit are arranged to have switching signals of the transmitter circuit and receiver circuit automatically synchronized at the same high frequency during the battery charging process without using a wireless communication system for feedback and synchronization purposes.

5. The system of claim 1, wherein the bidirectional switch is configured to perform handshaking with the transmitter circuit so as to inform the transmitter circuit whether the CC charging mode or the CV charging mode is selected to charge the battery.

6. The system of claim 1, wherein the power inverter is a full-bridge inverter, a half-bridge inverter or a multilevel inverter.

7. The system of claim 1, wherein the high frequency is set at a resonant frequency of a secondary resonator formed by the secondary coil and the second resonant capacitor, or at a frequency slightly higher than the resonant frequency of the secondary resonator so as to achieve soft switching in the power inverter.

8. The system of claim 1, wherein the receiver circuit further comprises a first mechanism configured to determine a State-of-Health of the battery after the battery is fully charged, and a second mechanism configured to transfer information related to a State-of-Charge to the transmitter circuit.

9. A method for wirelessly charging a battery comprising, the method comprising:
providing a wireless charging system that comprises:
a transmitter circuit comprising a power inverter used for driving a primary coil connected in series with a first resonant capacitor;
a receiver circuit comprising:
a secondary coil connected in series with a second resonant capacitor and a diode rectifier, an output of the diode rectifier being arranged to drive the battery directly without using an extra battery charging circuit to select a constant-current (CC) charging mode or a constant-voltage (CV) charging mode to charge the battery; and
a bidirectional switch having a dual function of charging the battery and handshaking with the transmitter circuit;
a transmitter controller configured to control the power inverter to switch at a constant and high frequency during normal wireless power transfer, and further configured to receive information generated from switching actions of the bidirectional switch of the receiver circuit during handshaking; and
a receiver controller configured to:
control the receiver circuit to switch at a constant and high frequency during normal wireless power transfer, and to switch at a low frequency to generate the information during a handshaking process;
compare a battery voltage ($V_{BAT}$) with a battery voltage threshold ($V_{OREG}$) and a battery charging current ($I_{BAT}$) with a charging current reference ($I_{BULK}$) so as to automatically select the CC charging mode or the CV charging mode; and
configure the receiver circuit to switch at the same constant and high frequency with the transmitter circuit during a battery charging process;
wherein the method further comprises:
automatically selecting the CC charging mode of the wireless charging system and regulating the battery charging current to a value of $I_{BAT(SC)}$ or $I_{PRECHG}$ or $I_{BULK}$ according a battery voltage in a battery charging profile when the battery voltage $V_{BAT}$ is less than a battery voltage threshold ($V_{OREG}$), wherein the battery charging profile includes the battery voltage $V_{BAT}$ increasing from an initial value to the battery voltage threshold ($V_{OREG}$); and
automatically selecting the CV charging mode of the wireless charging system and regulating the battery voltage to $V_{OREG}$ when $V_{BAT}$ is larger than or equal to $V_{OREG}$.

10. The method of claim 9 further comprising:
configuring both of the transmitter circuit and the receiver circuit to switch at the same high frequency during the battery charging process; and
configuring the transmitter circuit to switch at the same high frequency and the receiver circuit to switch at a relatively low frequency during the handshaking process.

11. The method of claim 9 further comprising:
controlling the receiver circuit to switch at the constant and high frequency during normal wireless power transfer, and to switch at the low frequency to generate the information during the handshaking process;
comparing the battery voltage ($V_{BAT}$) with the battery voltage threshold ($V_{OREG}$) and the battery charging current ($I_{BAT}$) with the charging current reference ($I_{BULK}$) so as to automatically select the CC charging mode or the CV charging mode; and
configuring the receiver circuit to switch at the same constant and high frequency with the transmitter circuit during the battery charging process.

12. The method of claim 9 further comprising:
determining a State-of-Health of the battery after the battery is fully charged; and
transferring information related to a State-of-Charge to the transmitter circuit.

13. The control method of claim 9 further comprising:
automatically synchronizing switching signals of the transmitter circuit and receiver circuit at the same high frequency during the battery charging process without using a wireless communication system for feedback and synchronization purposes.

* * * * *